US012607954B2

(12) United States Patent
Motohashi et al.

(10) Patent No.: US 12,607,954 B2
(45) Date of Patent: Apr. 21, 2026

(54) IMAGE FORMING METHOD WITH WHITE TONER AND COLOR TONER, AND IMAGE FORMING APPARATUS INCLUDING ANNULAR BELT, HEATING MEMBER, AND FACING MEMBER FACING SAID HEATING MEMBER VIA SAID ANNULAR BELT

(71) Applicant: Konica Minolta, Inc., Tokyo (JP)

(72) Inventors: Ami Motohashi, Tokyo (JP); Junya Ueda, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/825,649

(22) Filed: Sep. 5, 2024

(65) Prior Publication Data

US 2025/0093800 A1 Mar. 20, 2025

(30) Foreign Application Priority Data

Sep. 14, 2023 (JP) ................................ 2023-149305

(51) Int. Cl.
*G03G 15/20* (2006.01)
*G03G 15/00* (2006.01)

(52) U.S. Cl.
CPC ..... *G03G 15/2039* (2013.01); *G03G 15/2053* (2013.01); *G03G 15/6585* (2013.01); *G03G 2215/2074* (2013.01); *G03G 2215/208* (2013.01)

(58) Field of Classification Search
CPC . G03G 9/0821; G03G 9/0926; G03G 15/6585
See application file for complete search history.

(56) References Cited

U.S. PATENT DOCUMENTS

| | | | | |
|---|---|---|---|---|
| 4,957,774 A * | 9/1990 | Doi | .................... | G03G 15/2064 427/256 |
| 10,571,820 B2 * | 2/2020 | Noguchi | ............ | G03G 9/08755 |
| 10,795,305 B1 * | 10/2020 | Kuribayashi | ...... | G03G 15/6585 |
| 11,029,617 B2 * | 6/2021 | Chimoto | ............ | G03G 9/09791 |

(Continued)

FOREIGN PATENT DOCUMENTS

| | | |
|---|---|---|
| JP | 2021-162839 A | 10/2021 |
| JP | 2022-048310 A | 3/2022 |

OTHER PUBLICATIONS

English translation of JP_2021162839.*
English translation of JP-2021162839-A to Koeda Maiko (Year: 2021).*

*Primary Examiner* — Arlene Heredia Ocasio
(74) *Attorney, Agent, or Firm* — LUCAS & MERCANTI, LLP

(57) ABSTRACT

Provided is an image forming method including: forming, on a recording medium, a toner image including a white toner image and a color toner image disposed on the white toner image; and fixing the toner image onto the recording medium. In the fixing, the recording medium on which the toner image is formed is nipped between an annular belt, which includes an inner periphery that is at least partially supported by a heating member, and a facing member facing the heating member via the annular belt, and the toner image is fixed on the recording medium. The white toner and the color toner satisfy a relation of a following expression: $0.3 \leq \log \mu(W110) - \log \mu(C100)$.

8 Claims, 3 Drawing Sheets

(56) References Cited

U.S. PATENT DOCUMENTS

| | | | | |
|---|---|---|---|---|
| 2007/0212631 | A1* | 9/2007 | Abe | G03G 9/08797 430/110.3 |
| 2008/0241719 | A1* | 10/2008 | Niwa | G03G 9/0906 430/48 |
| 2018/0157187 | A1* | 6/2018 | Moffat | G03G 9/08755 |
| 2018/0173127 | A1* | 6/2018 | Moffat | G03G 9/0926 |

* cited by examiner

IMAGE FORMING METHOD WITH WHITE TONER AND COLOR TONER, AND IMAGE FORMING APPARATUS INCLUDING ANNULAR BELT, HEATING MEMBER, AND FACING MEMBER FACING SAID HEATING MEMBER VIA SAID ANNULAR BELT

CROSS REFERENCE TO RELATED APPLICATIONS

The entire disclosure of Japanese Patent Application No. 2023-149305, filed on Sep. 14, 2023, is incorporated herein by reference in its entirety.

BACKGROUND

Technological Field

The present invention relates to an image forming method and an image forming apparatus.

Description of Related Art

In the related art, full-color image formation using four colors of yellow, magenta, cyan, and black has been performed in electrophotographic image formation. Here, in a case where a full color image is formed on a white recording medium, an image having satisfactory color development is easily obtained, whereas in a case where a full color image is formed on a recording medium such as a color sheet, a black sheet, or a transparent film, an image having satisfactory color development is hardly obtained. Accordingly, it has been proposed to use a white toner as the fifth color toner for the base toner to form a white background image (see, for example, Patent Literature (hereinafter referred to as "PTL") 1).

In addition, it is also required that a toner image transferred onto a recording medium can be fixed at a low temperature (low-temperature fixability). In contrast, a method has been proposed in which a toner image is fixed onto the recording medium by using a fixing apparatus including an annular belt, a heating member disposed on a side of an inner peripheral surface of the annular belt, and a facing member disposed on a side of an outer peripheral surface of the annular belt so as to face the heating member (see, for example, PTL 2).

CITATION LIST

Patent Literatures

PTL 1

Japanese Patent Application Laid-Open No. 2022-48310

PTL 2

Japanese Patent Application Laid-Open No. 2021-162839

SUMMARY OF INVENTION

Technical Problem

In the fixing apparatus as described above, recording medium S on which toner layer T (toner image) is formed is heated in a nipped state between fixing belt 61 (annular belt) including an inner peripheral surface that is partially supported by heater 62 (heating member) and pressing roller 63 (facing member) facing heater 62 via fixing belt 61 (see FIG. 1A described later). For this reason, heat of heater 62 is likely to be transmitted directly to toner layer T, and toner layer T is easily fixed to the recording medium even at a relatively low temperature.

However, when a toner layer formed by superposing a white toner and a color toner is intended to be fixed onto a recording medium by using the fixing apparatus described above, the fixing belt is likely to receive a large friction force when the fixing belt rubs against the toner layer, the fixing belt may be worn, and surface roughness of an image may occur. In addition, due to abrasion of the fixing belt, the balance of tension applied to the fixing belt is broken, which may lead to breakage of the fixing belt.

The present invention has been made in consideration of the above-described circumstances, and an object of the present invention is to provide an image forming method and an image forming apparatus each capable of forming an image excellent in low-temperature fixability and having little image surface roughness.

SUMMARY

[1] An image forming method includes: forming, on a recording medium, a toner image including a white toner image and a color toner image disposed on the white toner image; and fixing the toner image onto the recording medium. In the fixing, the recording medium on which the toner image is formed is nipped between an annular belt, which includes an inner periphery that is at least partially supported by a heating member, and a facing member, which faces the heating member via the annular belt, and the toner image is fixed onto the recording medium under heating, and a white toner forming the white toner image and a color toner forming the color toner image satisfy a relationship of a following expression:

$$0.3 \leq \log \mu(W110) - \log \mu(C100)$$

where log μ(W110) is a logarithmic value of a viscosity of the white toner at 110° C., and log μ(C100) is a logarithmic value of the viscosity of the color toner at 100° C.

[2] The image forming method according to [1], in which in the fixing, the toner image is heated at 130° C. or more and 170° C. or less.

[3] The image forming method according to [1] or [2], in which log μ(W110) is 3.9 or more and 5.5 or less.

[4] The image forming method according to any one of [1] to [3], in which the white toner and the color toner satisfy a relationship of a following expression:

$$0 \leq \log \mu(W110) - \log \mu(C100) \leq 1.5.$$

[5] The image forming method according to any one of [1] to [4], in which the white toner contains a white toner base particle, and the white toner base particle has an average circularity of 0.920 and more and 0.955 or less.

[6] The image forming method according to any one of [1] to [5], in which the color toner contains a color toner base particle, and the color toner base particle has an average circularity of 0.920 and more and 0.955 or less.

[7] The image forming method according to any one of [1] to [6], in which the white toner and the color toner each have a water content of 0.1% or more and 0.6% or less.

[8] An image forming apparatus includes a fixer that fixes a toner image, which includes a white toner image and a color toner image disposed on the white toner image, onto a recording medium. The fixer includes: an annular belt; a heating member disposed on a side of an inner peripheral surface of the annular belt; and a facing member disposed on a side of an outer circumferential surface of the annular belt and facing the heating member via the annular belt. The fixer nips the recording medium, on which the toner image is formed, between the annular belt, which is supported by the heating member, and the facing member, and fixes the toner image onto the recording medium. The white toner and the color toner satisfy a relationship of a following expression:

$$0.3 \leq \log \mu(W110) - \log \mu(C100)$$

where log μ(W110)) is a logarithmic value of a viscosity of the white toner at 110° C., and log μ (C100) is a logarithmic value of the viscosity of the color toner at 100° C.

Advantageous Effects of Invention

According to the present invention, it is possible to provide an image forming method and an image forming apparatus each capable of forming an image excellent in low-temperature fixability and having little image surface roughness.

BRIEF DESCRIPTION OF DRAWINGS

The advantageous and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

As described above, a fixing belt is prone to wear and breakage when a toner layer obtained by superposing a white toner and a color toner is fixed onto a recording medium by using the fixing apparatus described above. The mechanism is presumed as follows.

Figure 1A:
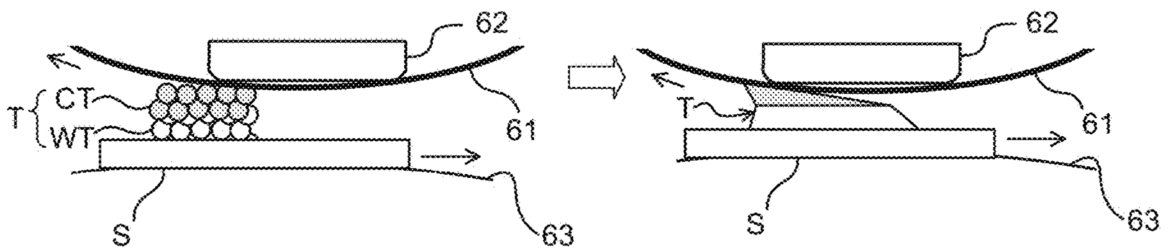
FIG. 1A is a schematic diagram illustrating how a toner image on a recording medium is fixed under conditions in the related art.
Figure 1B:
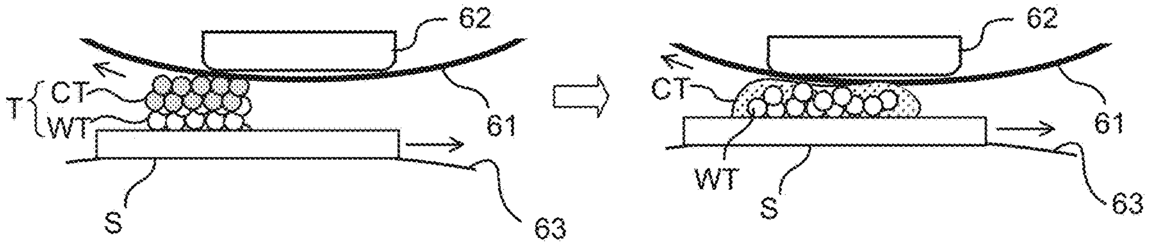
FIG. 1B is a schematic diagram illustrating how a toner image on a recording medium is fixed under conditions according to an embodiment of the present invention.

FIG. 1A is a schematic diagram illustrating how a toner image is fixed under conditions in the related art, and FIG. 1B is a schematic diagram illustrating how a toner image is fixed under conditions according to an embodiment of the present invention.

In a case where an image is formed by superposing white toner WT and color toner CT, the amount of toner adhesion onto recording medium S increases. As in the related art, when toner layer T in its entirety having a large adhesion amount is melted, toner layer T is likely to be melted well on the whole and to be firmly fused to the recording medium (see FIG. 1A). Accordingly, fixing belt 61 that slides is likely to receive a large friction force when separating from toner layer T strongly fused with the recording medium, and wear and breakage of fixing belt 61 are likely to occur.

In particular, fixing belt 61 is likely to be damaged because it is likely to directly receive heat from heater 62. Furthermore, heater 62 has a pad shape and has a relatively large area, and thus, the area of fixing belt 61 that receives a friction force is also large. Accordingly, wear and breakage of fixing belt 61 are more likely to occur.

The inventors of the present invention, on the other hand, have found that a friction force that fixing belt 61 receives from the surface of toner layer T can be reduced by not melting toner layer T in its entirety, but by not melting a part of toner layer T (see FIG. 1B).

That is, in the image forming method according to an embodiment of the present invention, the viscosity of white toner WT in the lower layer around the fixing temperature is caused to be higher than the viscosity of color toner CT in the upper layer around the fixing temperature by a predetermined value or more. Specifically, the logarithmic value log (W110) of the viscosity of the white toner around the fixing temperature (100 to 110° C.) is caused to be higher than the logarithmic value log C(100) of the viscosity of the color toner around the fixing temperature by 0.3 or more. Note that, the fixing temperature refers to the setting temperature (the temperature of the heater) of the fixing belt in contact with toner layer T, and means, in fixing section 60 in FIG. 3 described later, the temperature of heater 62.

Thus, color toner CT in the upper layer melts, whereas white toner WT in the lower layer is not completely melted and is likely to remain in the form of particles (see FIG. 1B). That is, while the surface of toner layer T melts and has a low viscosity, the inside of toner layer T is not completely melted and is in a state in which voids are maintained between particles to some extent. Thus, a friction force generated at a nip section is likely to be dispersed in a contact portion between toner base particles. As a result, it is considered that a friction force generated between the surface of toner layer T and the surface of fixing belt 61 is reduced, and thus, image surface roughness and breakage of fixing belt 61 can be suppressed.

In addition, the average circularity of toner base particles contained in these toners is preferably appropriately low. When the average circularity of toner base particles is appropriately low, an appropriate gap is likely to be formed between toner base particles, and a friction force that the fixing belt that slides receives from toner layer T can be more easily dispersed and can be further reduced.

Hereinafter, an image forming method according to an embodiment of the present invention will be described in detail. First, toners will be described, and then the image forming method will be described.

1. Toner

The toners used in the image forming method according to the present embodiment are developers for developing an electrostatic charge image (electrostatic latent image) formed in an image bearing member such as a photoreceptor. In the present embodiment, a white toner and a color toner are used.

Then, the relationship between the viscosities of the white toner and the color toner is adjusted so as to satisfy the following expression 1:

[1]

$$0.3 \leq \log \mu(W110) - \log \mu(C100) \quad \text{(Expression 1)}$$

where log μ(W110) is a logarithmic value of the viscosity of the white toner at 110° C., and log μ(C100) is a logarithmic value of the viscosity of the color toner at 100° C.

When log μ(W110)−log μ(C100) is equal to or greater than 0.3, the viscosity of the white toner in the lower layer is appropriately higher than the viscosity of the color toner in the upper layer around the fixing temperature. That is, while the surface of a toner image has a low viscosity and melts, the inside of the toner image is not completely melted and is in a state in which voids are maintained between particles to some extent. Thus, a friction force that the fixing belt receives at a nip section can be reduced. From the same viewpoint, log μ(W110)−log μ(C100) is preferably equal to or greater than 0.5. The upper limit of log μ(W110)−log μ(C100) is not particularly limited, but is preferably equal to or less than 2.0, and more preferably equal to or less than 1.5, from the viewpoint of further preventing impairment of low-temperature fixability.

The viscosities of the toners can be measured by using a flowtester (for example, CFT-500 manufactured by Shimadzu Corporation) under the following conditions and procedures.

1) First, 1.1 g of a toner is charged, in a powder state, into a cylinder kept warm at 50° C., and is preheated with a warm-up time of 300 seconds.
2) Next, while the toner is heated at a rate of 6° C./min, the toner is pressurized (a load of 2 kg is applied) by a plunger, and the melted toner is caused to flow out through a die hole (hole inner diameter: 1.0 mm, die length: 1.0 mm) provided in a lower portion of the cylinder.
3) Data is measured until the elution is completed. Then, in the case of the white toner, the viscosity value when the temperature reaches 110° C. is read, and in the case of the color toner, the viscosity value when the temperature reaches 100° C. is read, and the viscosities are subjected to logarithmic conversion to calculate log μ(W110) and log μ(C100).

The viscosity relationship described above can be adjusted by the resin composition of the white toner and the color toner. For example, when the melting point of a binder resin contained in the white toner is configured to be higher than the melting point of a binder resin contained in the color toner, the difference between the logarithmic values is likely to increase.

The viscosity of the white toner may be in a range satisfying expression 1 described above, but is preferably appropriately high from the viewpoint of further reducing a friction force that the fixing belt receives. Specifically, log μ(W110) of the white toner is preferably 3.9 or more and 5.5 or less. When log μ(W110) described above is 3.9 or more, the ratio of white toner particles which remain without melting even when heated at the time of fixing can be appropriately increased. Thus, the entire toner on a recording sheet is less excessively fused, and a friction force that the fixing belt receives can be more dispersed. When log μ(W110) described above is equal to or less than 5.5, on the other hand, the ratio of white toner particles which are not melted does not excessively increase, and thus, it is possible to make it difficult for the entire toner to be divided into the color toner layer in a melted state and the white toner layer in a powder state. As a result, it is possible to further prevent the color toner layer in the upper layer from being peeled off by the fixing belt and to further prevent a color shift from occurring in the fixed image. In addition, fixability to a recording medium is also less likely to be impaired. From the same viewpoint, log μ(W110) described above is more preferably 4.1 or more and 5.2 or less.

The viscosity of the color toner may be within a range that satisfies expression 1 described above, but is preferably appropriately low from the viewpoint of further maintaining the low-temperature fixability. For example, log μ(C100) of the color toner is preferably 3.5 or more and 4.5 or less. When log μ(C100) described above is 3.5 or more, the surface layer of the toner layer does not excessively melt by heating at the time of fixing, and thus, a friction force that the fixing belt receives can be further reduced. When log μ(C100) described above is 4.5 or less, on the other hand, the color toner can be further melted by heating at the time of fixing, and thus, the fixability of the toner layer with respect to a recording medium can be further enhanced. From the same viewpoint, log μ(C100) described above is preferably 3.9 or more and 4.3 or less.

The viscosity of each toner can be adjusted mainly by the amount and composition of the binder resin contained in the toner. For example, when the amount of the binder resin contained in the toner is increased or the content ratio of the crystalline resin to the amorphous resin is decreased, the viscosity of the white toner is likely to increase.

Hereinafter, each toner will be described in detail.

1-1. White Toner

The white toner contains white toner particles. The white toner particles include white toner base particles, and may further include an external additive, if necessary.

1-1-1. White Toner Base Particles

The white toner base particles contain a binder resin and a white colorant.

(Binder Resin)

The binder resin binds the toner to a recording medium. The binder resin may contain an amorphous resin, may contain a crystalline resin, or may contain both a crystalline resin and an amorphous resin. Only one kind of a binder resin may be contained or two or more kinds of binder resins may be contained.

In the present embodiment, from the viewpoint of achieving both image strength and low-temperature fixability, the binder resin preferably contains an amorphous resin and a crystalline resin.

Note that, in the present specification, the crystalline resin refers to a resin whose melting point is observed in measurement using differential scanning calorimetry (DSC). In addition, the amorphous resin means a resin whose melting point is not observed in measurement using DSC. In addition, in the present specification, the fact that a melting point is observed in a resin means that the resin has a clear endothermic peak rather than a stepwise endothermic change in DSC, and specifically means that an endothermic peak having a half-width of 15° C. or less is observed when measurement is performed at a rate of temperature increase of 10° C./min.

Furthermore, in the present specification, the expression "the binder resin contains an amorphous resin" means that the binder resin may contain the amorphous resin itself, or may contain the amorphous resin as a segment included in another resin, such as an amorphous resin segment in a hybrid resin.

Similarly, the expression "the binder resin contains a crystalline resin" may indicate an aspect in which the binder resin contains the crystalline resin itself, or the binder resin may contain the crystalline resin as a segment included in another resin, such as a crystalline polyester polymerized segment in a hybrid resin.

(Amorphous Resin)

Examples of the amorphous resin include a styrene resin, a vinyl resin (e.g., an acrylic resin, a styrene-acrylic resin, and the like), a urethane resin, a urea resin, a polyester resin, a silicone resin, an olefin resin, and a polyamide resin. Only one kind of these may be contained, or two or more kinds of these may be contained. The binder resin preferably contains, inter alia, an amorphous polyester resin. This is because the compatibility with a crystalline polyester resin to be described later is satisfactory.

The amorphous polyester resin has a polycondensation unit of a divalent or higher carboxylic acid (polycarboxylic acid) and a divalent or higher alcohol (polyhydric alcohol).

Examples of the polyvalent carboxylic acid include a saturated aliphatic dicarboxylic acid such as succinic acid, sebacic acid and dodecanedioic acid; an unsaturated aliphatic dicarboxylic acid such as maleic acid, fumaric acid and itaconic acid; an alicyclic dicarboxylic acid such as cyclohexanedicarboxylic acid; an aromatic dicarboxylic acid such as phthalic acid, isophthalic acid and terephthalic acid; a trivalent or higher polyvalent carboxylic acid such as trimellitic acid and pyromellitic acid; acid anhydrides thereof; and alkyl esters thereof having 1 to 3 carbon atoms. One kind of these may be used alone or two or more kinds thereof may be used in combination. From the viewpoint of increasing the viscosity of the white toner, the polyvalent carboxylic acid of the amorphous polyester resin in the white toner base particles preferably includes, inter alia, an aromatic dicarboxylic acid, and more preferably includes terephthalic acid.

Examples of the polyhydric alcohol include an aliphatic diol such as ethylene glycol, 1,2-propanediol, 1,3-propanediol, 1,4-butanediol, 1,5-pentanediol, 1,6-hexanediol, 1,7-heptanediol, 1,8-octanediol, neopentyl glycol, and 1,4-butenediol; and a trivalent or higher alcohol such as glycerin, pentaerithritol, trimethylolpropane, and sorbitol. The polyhydric alcohol is preferably an aliphatic diol.

As the polyvalent carboxylic acid and the polyhydric alcohol, in addition to the materials described above, for example, bisphenols such as bisphenol A and bisphenol F, alkylene oxide adducts of bisphenols such as ethylene oxide adducts and propylene oxide adducts thereof, and the like can also be used. One kind of these may be used alone or two or more kinds thereof may be used in combination. The polyhydric alcohol preferably contains, inter alia, an ethylene oxide adduct or a propylene oxide adduct of bisphenol A.

The number average molecular weight of the amorphous polyester resin is not particularly limited, but is preferably, for example, 2000 or more and 10000 or less. The number average molecular weight can be measured by gel permeation chromatography in terms of polystyrene.

The content of the amorphous resin is, for example, preferably 50% by mass or more and 99% by mass or less, and more preferably 55% by mass or more and 83% by mass or less, or 60% by mass or more and 80% by mass or less, with respect to the resin (binder resin) constituting the toner base particles.

[Crystalline Resin]

Examples of the crystalline resin include a crystalline polyester resin, a crystalline polyamide resin, a crystalline polyurethane resin, a crystalline polyacetal resin, a crystalline polyphenylene sulfide resin, and a crystalline polyether ether ketone resin. Only one kind of these may be contained, or two or more kinds of these may be contained. The crystalline resin preferably contains, inter alia, a crystalline polyester resin. This is because the crystalline polyester resin is likely to melt at the time of thermal fixing and act as a plasticizer for the amorphous resin, and the low-temperature fixability is likely to be further improved.

The crystalline polyester resin has a polycondensation unit of a polyvalent carboxylic acid and a polyhydric alcohol. As the polyvalent carboxylic acid and the polyhydric alcohol that constitute the crystalline polyester resin, the same polyvalent carboxylic acid and polyhydric alcohol as those constituting the amorphous polyester resin described above can be used.

From the viewpoint of further enhancing the low-temperature fixability while satisfying the relationship of expression 1, the polyvalent carboxylic acid of the crystalline polyester resin contained in the white toner base particles preferably contains, inter alia, an aliphatic dicarboxylic acid, and more preferably contains a linear aliphatic dicarboxylic acid.

The monomer constituting the crystalline polyester resin preferably contains 50% by mass or more of a linear aliphatic monomer, and more preferably 80% by mass or more thereof. When the content of the linear aliphatic monomer is 50% by mass or more, the crystallinity can be more easily maintained in the toner, and when the content is 80% by mass or more, the more sufficient crystallinity can be maintained.

The melting point of the crystalline polyester is, for example, preferably 50° C. or higher and 85° C. or lower, and more preferably 60° C. or higher and 80° C. or lower. When the melting point of the crystalline polyester is within the above range, the toner base particles can be more easily softened and the low-temperature fixability of the toner can be further enhanced.

The number average molecular weight (Mn) of the crystalline polyester is preferably 2000 or more and 10000 or less. When the number average molecular weight (Mn) of the crystalline polyester is within the above range, the low-temperature fixability becomes more satisfactory.

The content of the crystalline resin is preferably 1% by mass or more and 50% by mass or less, more preferably 17% by mass or more and 45% by mass or less, and still more preferably 20% by mass or more and 40% by mass or less, with respect to the binder resin. When the content of the crystalline resin is 1% by mass or more, the low-temperature fixability of the toner can be further enhanced. When the content of the crystalline resin is 50% by mass or less, the heat resistance and the strength of the toner are less likely to be impaired.

In particular, the content ratio of the amorphous polyester resin to the crystalline polyester resin is preferably 83/17 to 55/45 (mass ratio), and more preferably 80/20 to 60/40 (mass ratio). When the content of the amorphous polyester resin increases, the melting point of the binder resin is likely to be high, and thus, the viscosity of the white toner is likely to increase. When the content of the amorphous polyester resin is small, the content of the crystalline polyester resin is large, and thus, the viscosity of the white toner is likely to be low.

The total amount of the amorphous polyester resin and the crystalline polyester resin is preferably 10% by mass or more, and more preferably 15% by mass or more and 100% by mass or less, with respect to the binder resin.

As described above, the crystalline resin and the amorphous resin may be contained as a hybrid resin including a crystalline resin segment and an amorphous resin segment. Toner base particles containing such a hybrid resin may have a core-shell structure. The core in the core-shell structure preferably contains a crystalline resin, and the shell in the core-shell structure preferably contains an amorphous resin.

The content of the binder resin in the white toner base particles is preferably 20% by mass or more and 99% by mass or less, more preferably 30% by mass or more and 95% by mass or less, and still more preferably 40% by mass or more and 90% by mass or less, with respect to the white toner base particles. When the content of the binder resin is 20% by mass or more, the strength of an image to be formed can be further increased.

(White Colorant)

Examples of the white colorant include an inorganic pigment (e.g., heavy calcium carbonate, light calcium carbonate, titanium oxide, aluminum hydroxide, titanium white, talc, calcium sulfate, barium sulfate, zinc oxide, magnesium oxide, magnesium carbonate, amorphous silica, colloidal silica, white carbon, kaolin, calcined kaolin, delaminated kaolin, aluminosilicate, sericite, bentonite, smectite, and the like) and an organic pigment (e.g., polystyrene resin particles, urea formalin resin particles, and the like). The white colorant is preferably titanium oxide from the viewpoints of chargeability and concealing property. Titanium oxide having any crystal structure such as those of an anatase type, a rutile type, a brookite type, and the like can be used.

The amount of the white colorant is preferably 30 parts by mass or more and 75 parts by mass or less, and more preferably 40 parts by mass or more and 60 parts by mass or less, with respect to 100 parts by mass of the binder resin.

(Other Components)

The white toner base particles may further contain other components such as a releasing agent and a charge control agent as necessary.

As the releasing agent, any of various known waxes can be used. Examples of the wax include polyolefin wax such as polyethylene wax and polypropylene wax, branched chain hydrocarbon wax such as microcrystalline wax, long-chain hydrocarbon-based wax such as paraffin wax and Sasol wax, dialkyl ketone-based wax such as distearyl ketone, ester-based wax such as carnauba wax, montan wax, behenic acid behenate, trimethylolpropane tribehenate, pentaerythritol tetrabehenate, pentaerythritol diacetate dibehenate, glycerin tribehenate, 1,18-octadecanediol distearate, tristearyl trimellitate, and distearyl maleate, and amide-based wax such as ethylenediamine behenylamide and trimellitic acid tristearylamide. In addition, one kind of these releasing agents may be used alone or two or more kinds thereof may be used in combination.

The content of the releasing agent is not particularly limited, but is preferably 4 parts by mass or more and 30 parts by mass or less, and more preferably 5 parts by mass or more and 20 parts by mass or less, with respect to 100 parts by mass of the binder resin.

The charge control agent can adjust the chargeability of toner base particles. Examples of the charge control agent include a nigrosine dye, a metal salt of naphthenic acid or a higher fatty acid, an alkoxylated amine, a quaternary ammonium salt compound, an azo metal complex, a salicylic acid metal salt or a metal complex thereof.

The content of the charge control agent is preferably 0.1 parts by mass or more and 10 parts by mass or less, and more preferably 0.5 parts by mass or more and 5 parts by mass or less, with respect to 100 parts by mass of the binder resin.

1-1-2. External Additive

The white toner particles may further contain an external additive in order to increase the fluidity and the chargeability of the white toner. The external additive adheres to the surfaces of the white toner base particles as a post-treatment agent.

As the external additive, metal oxide particles known in the art can be used for the purpose of controlling fluidity and chargeability, and examples thereof include silica particles; titania particles; alumina particles; zirconia particles; zinc oxide particles; chromium oxide particles; cerium oxide particles; antimony oxide particles; tungsten oxide particles; tin oxide particles; tellurium oxide particles; manganese oxide particles, and boron oxide particles. One kind of these may be used alone or two or more kinds thereof may be used in combination.

Furthermore, the external additive may contain organic fine particles of a homopolymer of styrene, methyl methacrylate, or the like, a copolymer thereof, and the like.

In addition, the external additive may contain a lubricant in order to further improve the cleaning performance and the transferability. Examples of the lubricant include a metal salt of a higher fatty acid, such as a salt of zinc, aluminum, copper, magnesium, calcium, or the like of stearic acid, a salt of zinc, manganese, iron, copper, magnesium, or the like of oleic acid, a salt of zinc, copper, magnesium, calcium, or the like of palmitic acid, a salt of zinc, calcium, or the like of linoleic acid, and a salt of zinc, calcium, or the like of ricinoleic acid.

The shape of the external additive is also not limited, and may be any of a spherical shape, a flat shape, a plate shape, and a needle shape.

The content of the external additive is preferably 1 part by mass or more and 7 parts by mass or less, and more preferably 2 parts by mass or more and 4 parts by mass or less, with respect to 100 parts by mass of toner base particles.

1-1-3. Physical Properties of White Toner (Volume-Based Median Diameter (D50))

The volume-based median diameter (D50) of white toner base particles is, for example, preferably 3.0 μm or more and 10.0 μm or less, and is preferably 5.0 μm or more and 8.0 μm or less. When the D50 of white toner base particles is 3.0 μm or more, the gap between the particles is also appropriately large, and thus, a friction force that the fixing belt receives can be further reduced. That is, by configuring the particle diameter to be equal to or greater than a certain value, it is easy to secure the gap between the particles to be equal to or greater than a certain value. Accordingly, it is easy to secure an opportunity to disperse a friction force that the belt receives at the time of fixing, and it is possible to further suppress belt breakage. When the particle diameter of white toner base particles is 10.0 μm or less, not only a finer dot image can be faithfully reproduced, but also less heat energy is required for melting, and thus, the fixability becomes more satisfactory.

The D50 of white toner base particles may be the same as or different from the D50 of color toner base particles. Among these, from the viewpoint of more easily maintaining the fixability onto a recording medium, the D50 of white toner base particle is preferably larger than the D50 of color toner base particle in order that the toner in the upper layer is more likely to melt and spread to cover the white toner in the lower layer.

The volume-based median diameter (D50) can be measured and calculated using, for example, an apparatus in which a computer system for data processing is connected to "Multisizer 3 (manufactured by Beckman Coulter, Inc.)".

The measurement procedure is as follows. 0.02 g of toner particles are caused to be intimate with 20 ml of a surfactant solution (a surfactant solution used for the purpose of dispersing toner particles and obtained, for example, by diluting a neutral detergent containing a surfactant component ten-fold with pure water), and then ultrasonic dispersion is performed for 1 minute to fabricate a toner particle dispersion. This toner particle dispersion is injected with a pipette into a beaker held in a sample stand and containing ISOTON II (manufactured by Beckman Coulter, Inc.) until the measured concentration reaches 5 to 10%, and the number of particles to be counted in a measuring machine is set to 25000 and measurement is performed. Note that, Multisizer 3 having an aperture diameter of 100 μm is used. The range of measurement of 1 to 30 μm is divided into 256 sections, the number of frequency in each section is calculated, and the particle diameter when a cumulative volume fraction cumulated from the largest volume fraction is 50% is used as the volume-based median diameter (D50).

In a case where the toner is obtained by a pulverization method, the D50 of white toner base particles can be controlled mainly by pulverization conditions (the number of revolutions of a pulverizer and pulverization time) and classification conditions.

(Average Circularity)

The average circularity of white toner base particles is not particularly limited, but is preferably, for example, 0.920 or more and 0.955 or less. When the average circularity of white toner base particles is 0.920 or more, the rise in charging and the fluidity are more easily enhanced. When the average circularity of white toner base particles is 0.955 or less, appropriate voids can be formed between the particles, and thus, a friction force that the fixing belt receives at the time of sliding with the toner layer can be further reduced. From the same viewpoint, the average circularity of white toner base particles is more preferably 0.940 or more and 0.953 or less.

The average circularity of white toner base particles can be measured by the following method.

Toner particles are wetted in a surfactant solution, ultrasonic dispersion is performed for 1 minute to disperse the toner particles, and then measurement is performed using a flow-type particle image analyzer "FPIA-3000" (manufactured by Sysmex Corporation) under measurement conditions of an HPF (high-power field imaging) mode at an appropriate density corresponding to an HPF detection number of 3000 to 10000 particles. Within this range, a reproducible measurement value can be obtained. The circularity is calculated by the following expression:

Circularity=(Perimeter of a circle having the same projected area as a particle image)/(Perimeter of a projected image of the particle).

The average circularity is an arithmetic average value obtained by adding up the circularities of the individual particles and dividing the sum by the total number of the measured particles.

The average circularity of white toner base particles may be the same as or different from the average circularity of color toner base particles. In particular, from the viewpoint of reducing the friction between the fixing belt and a toner image, the average circularity of white toner base particles is preferably lower than the average circularity of color toner base particles.

The average circularity of white toner base particles can be adjusted by a toner production method to be described later, conditions for heat treatment of toner base particles, and the like. For example, toner base particles produced by a pulverization method are likely to have a low average circularity.

(Water Content)

The water content in the white toner is, for example, preferably 0.1% or more and 0.6% or less, and more preferably 0.2% or more and 0.5% or less. When the water amount is 0.6% or less, the amount of evaporation of water contained in the toner due to heating at the time of fixing can be further reduced. For this reason, hydrolysis of a coating resin (PI) of the fixing belt can be further reduced, and belt wear can be further suppressed. When the water content is 0.1% or more, the toner is less likely to be charged, and thus, charging due to friction between the toner and the surface of the fixing belt can be further suppressed, and scattering of the toner can be further suppressed.

The water content in the white toner may be the same as or different from the water content in the color toner. Above all, from the viewpoint of reducing friction with the fixing belt, it is preferable that there is no difference in water content therebetween. Accordingly, it is preferable that the water amount in the white toner, which is in the lower layer where the contained water is hardly evaporated at the time of fixing, is the same as or smaller than the water amount in the color toner.

The water content in the white toner can be adjusted by the toner production method and drying conditions. For example, the water content in a toner produced by a pulverization method is likely to be smaller than that produced by an emulsion aggregation method or a suspension polymerization method. In addition, when the drying time is prolonged or the drying temperature is increased, the water content moisture in the toner is likely to decrease.

1-2. Color Toner

The color toner is a toner that imparts a predetermined color tone to an image. The color toner contains color toner particles. The color toner particles contain color toner base particles, and may further contain an external additive attached to the surface thereof, if necessary.

1-2-1. Color Toner Base Particles

The color toner base particles contain a binder resin and a colorant.

(Binder Resin)

The binder resin contained in color toner base particles may be any of an amorphous resin, a crystalline resin, and a hybrid resin, in the same manner as white toner base particles. In particular, the binder resin contained in color toner base particles preferably contains a crystalline polyester resin and an amorphous polyester resin.

As the polyvalent carboxylic acid and the polyhydric alcohol that constitute the amorphous polyester resin contained in color toner base particles, the same polyvalent carboxylic acid and the same polyhydric alcohol as those constituting the amorphous polyester resin contained in white toner base particles can be used. Similarly, as the polyvalent carboxylic acid and the polyhydric alcohol that constitute the crystalline polyester resin contained in color toner base particles, the same polyvalent carboxylic acid and the same polyhydric alcohol as those constituting the crystalline polyester resin contained in white toner base particles can be used.

Among these, the polyvalent carboxylic acid of the amorphous polyester resin contained in color toner base particles preferably contains an aliphatic carboxylic acid from the viewpoint of easily satisfying the relationship of expression 1, and more preferably contains an unsaturated aliphatic carboxylic acid, which is considered to exhibit the hardness of the resin, from the viewpoint of the abrasion resistance of a toner image. This is because the viscosity of the color toner around the fixing temperature can be appropriately lowered.

The range of the content ratio of the amorphous polyester resin to the crystalline polyester resin in color toner base particles may be the same as the range of the content ratio of the amorphous polyester resin to the crystalline polyester resin in white toner base particles.

The total amount of the amorphous polyester resin and the crystalline polyester resin in color toner base particles is preferably 10% by mass or more, and more preferably 15% by mass or more and 50% by mass or less, with respect to the binder resin.

The content of the binder resin in color toner base particles is preferably 70% by mass or more and 90% by mass or less, and more preferably 75% by mass or more and 87% by mass or less, with respect to color toner base particles.

(Colorant)

As the colorant, a pigment can be used. Color toner base particles may contain a colorant, such as a yellow, magenta, cyan, or black colorant, according to a color tone to be exhibited by the color toner. Color toner base particles may contain only one kind of a colorant or a plurality of colorants in combination.

Examples of the colorant contained in the yellow toner include: C. I. Solvent Yellows 19, 44, 77, 79, 81, 82, 93, 98, 103, 104, 112, and 162, and C. I. Pigment Yellows 14, 17, 74, 93, 94, 138, 155, 180, and Examples of the colorant contained in the magenta toner include C. I. Solvent Reds 1, 49, 52, 58, 63, 111, and 122, and C. I. Pigment Reds 5, 48:1, 53:1, 57:1, 122, 139, 144, 149, 166, 177, 178, and 222.

Examples of the colorant contained in the cyan toner include C. I. Pigment Blue 15:3.

Examples of the colorant contained in the black toner include carbon black, a magnetic material, and titanium black. Examples of the carbon black include channel black, furnace black, acetylene black, thermal black, and lamp black. Examples of the magnetic material include a ferromagnetic metal such as iron, nickel, and cobalt, an alloy containing these ferromagnetic metals, a compound of a ferromagnetic metal such as ferrite and ferromagnetic, and an alloy which do not contain a ferromagnetic metal but exhibits ferromagnetism by heat treatment. Examples of the alloy that exhibits ferromagnetism by heat treatment include a Heusler alloy such as manganese-copper-aluminum and manganese-copper-tin, and chromium dioxide.

The content of the colorant is not particularly limited, but is preferably 1 part by mass or more and 20 parts by mass or less, and more preferably 10 parts by mass or more and 17 parts by mass or less, with respect to 100 parts by mass of the binder resin.

1-2-2. External Additive

Color toner particles may further include an external additive. The external additive adheres to the surfaces of the color toner base particles as a post-treatment agent. As the external additive, the same external additive as that in white toner particles described above can be used.

1-2-2. Physical Properties of Color Toner

The volume-based median diameter (D50) and the average circularity of the color toner base particles, and the water content in the color toner can be configured to be in the same ranges as described above, respectively.

In particular, the D50 of color toner base particles is preferably smaller than the D50 of white toner base particles in order to allow the toner in the upper layer to melt and spread so as to cover the white toner in the lower layer from the viewpoint of more easily maintaining the fixability of the toner layer, in which the color toner is superposed on the white toner, onto a recording medium. Furthermore, the average circularity of color toner base particles is preferably higher than the average circularity of white toner base particles from the viewpoint of reducing friction between the fixing belt and a toner image.

1-3. Common Matters

Each of the white toner and the color toner may be a one-component developer, or a two-component developer containing toner particles and carrier particles. In the present embodiment, both the white toner and the color toner are preferably one-component developers.

1-4. Method for Producing White Toner and Color Toner

The white toner and the color toner can be produced by a method such as a pulverization method, an emulsion dispersion method, a suspension polymerization method, a dispersion polymerization method, an emulsion polymerization method, or an emulsion polymerization aggregation method. Among these, a pulverization method and an emulsion polymerization aggregation method are preferable, and a pulverization method is more preferable. Toner base particles fabricated by a pulverization method are particles having an irregular shape, and thus, an appropriate gap is likely to be formed between the particles. This makes it easier to reduce a friction force that the fixing belt receives from a toner image at the time of fixing.

In a pulverization method, toner base particles can be obtained by pulverizing a resin composition obtained by melting and kneading a binder resin and a colorant, followed by cooling. Furthermore, after the pulverization treatment, classification treatment and/or drying treatment may be performed as necessary.

(Mixing, Melting, and Kneading)

First, the materials (binder resin, colorant, and the like) constituting toner base particles are mixed. The mixing can be performed by a mixing apparatus such as a double-cone mixer, a V-type mixer, a drum-type mixer, a super mixer, a Henschel mixer, a Nauta mixer, and a Mechano Hybrid.

Next, the mixed materials are melt-kneaded. For the melt-kneading, a batch kneader such as a pressure kneader and a Banbury mixer, or a continuous kneader can be used. In continuous production, a single-screw extruder or a twin-screw extruder is preferably used. Examples of the twin-screw extruder include a KTK twin-screw extruder (manufactured by Kobe Steel, Ltd.), a TEM twin-screw extruder (manufactured by Toshiba Machine Co., Ltd.), a PCM kneader (manufactured by Ikegai Corp.), a twin-screw extruder (manufactured by Kabushiki Kaisha KCK), a co-kneader (manufactured by Buss AG), and a KNEADEX (manufactured by Nippon Coke & Engineering Co., Ltd.). The temperature of melt-kneading is preferably approximately 100 to 200° C. The resin composition obtained by melt-kneading is rolled with two rolls or the like, and rapidly cooled with water or the like to form a solid.

(Pulverization)

The resulting resin composition is pulverized into a desired particle diameter. The pulverization may be performed, for example, by coarse pulverization with a pulverizer such as a crusher, a hammer mill or a feather mill, and then fine pulverization with a fine pulverizer such as a Kryptron System (manufactured by Kawasaki Heavy Industries, Ltd.), a Super Rotor (manufactured by Nisshin Engineering Inc.) or a Turbo Mill (manufactured by Freund-Turbo Corporation), and an air jet type fine pulverizer.

(Classification)

Thereafter, if necessary, the pulverized resin composition is classified. The classification can be performed using a classifier or a sieving machine, such as an Elbow-Jet of an inertial classification system (manufactured by Nittetsu Mining Co., Ltd.), a Turboplex of a centrifugal classification system (manufactured by Hosokawa Micron Corporation), a TSP separator (manufactured by Hosokawa Micron Corporation), and a Faculty (manufactured by Hosokawa Micron Corporation).

(Drying)

Furthermore, if necessary, the resin composition after the classification may be dried. The drying method is not particularly limited, and examples thereof include methods using an oven, a spray dryer, a vacuum freeze dryer, a reduced pressure dryer, a stationary shelf dryer, a movable shelf dryer, a fluidized bed dryer, a rotary dryer, and a stirring dryer.

In this way, toner base particles can be fabricated by the pulverization method.

(Addition of External Additive)

The resulting toner base particles may be used as they are, but may be subjected to external addition treatment with an external additive, if necessary. The external addition treatment can be performed by blending predetermined amounts of toner base particles and an external additive, and stirring and mixing the mixture with a mixing apparatus such as a double cone mixer, a V-type mixer, a drum mixer, a super mixer, a Henschel mixer, a Nauta mixer, Mechano Hybrid (manufactured by Nippon Coke & Engineering Co., Ltd.), and Nobilta (manufactured by Hosokawa Micron Corporation).

Next, an image forming method using the above-described white toner and color toner will be described.

2. Image Forming Method

[Configuration of Image Forming Apparatus]

Hereinafter, an image forming apparatus which can be used in the present embodiment will be described.

Figure 2:
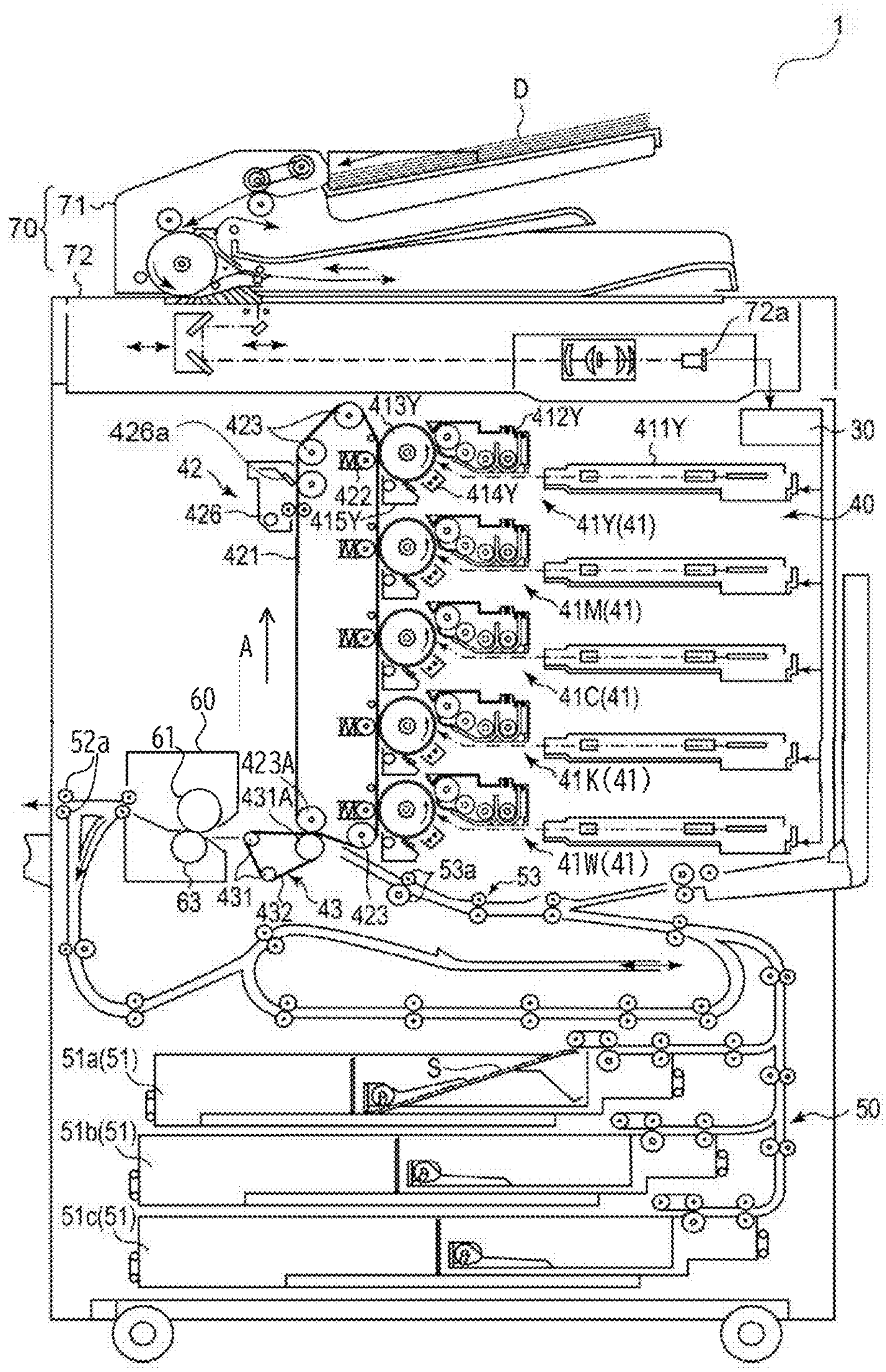
FIG. 2 is a cross-sectional diagram illustrating a configuration of an image forming apparatus according to an embodiment of the present disclosure.
Figure 3:
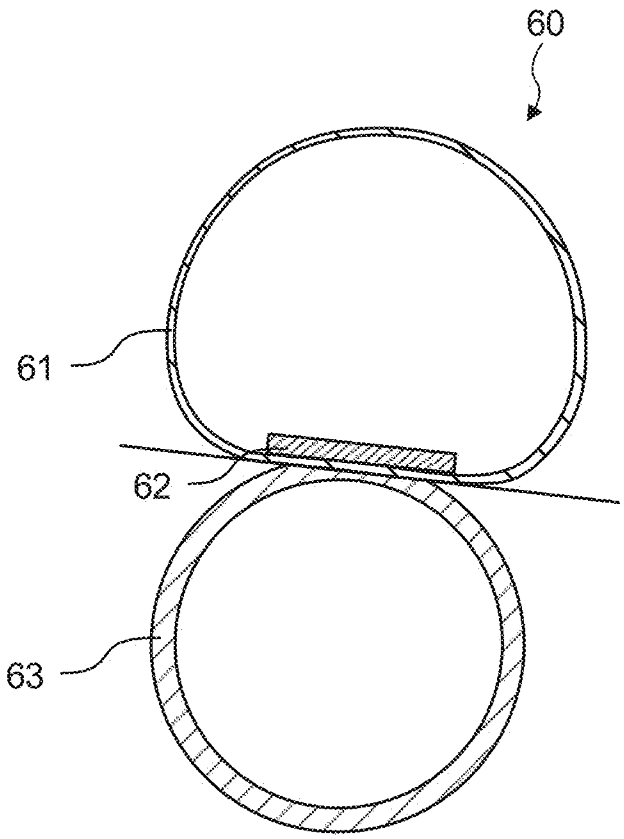
FIG. 3 is a schematic enlarged cross-sectional diagram illustrating a main part of a fixing section in FIG. 2.

FIG. 2 is a schematic configurational diagram illustrating an example of image forming apparatus 1 according to the present embodiment. FIG. 3 is an enlarged schematic diagram of a main part of fixing section 60 in FIG. 2.

Image forming apparatus 1 illustrated in FIG. 2 includes image processing section 30, image forming section 40, conveyance section 50, fixing section 60, and image reading section 70.

Image forming section 40 includes image forming units 41Y, 41M, 41C, 41K, and 41W that form an image with the respective color toners Y (yellow), M (magenta), C (cyan), K (black), and W (white). These all have the same configuration except for the toner to be stored. Accordingly, hereinafter, the symbols representing the colors may be omitted. Image forming section 40 further includes intermediate transfer unit 42 and secondary transfer unit 43. These correspond to a transfer apparatus.

Image forming unit 41 includes exposure apparatus 411, developing apparatus 412, electrophotographic photoreceptor (image bearing member) 413, charging apparatus 414, and drum cleaning apparatus 415. Charging apparatus 414 is, for example, a corona charger. Charging apparatus 414 may also be a contact charging apparatus that charges electrophotographic photoreceptor 413 by bringing a contact charging member such as a charging roller, a charging brush, a charging blade or the like into contact with electrophotographic photoreceptor 413. Exposure apparatus 411 includes, for example, a semiconductor laser as a light source, and a light deflection apparatus (polygon motor) that emits a laser beam corresponding to an image to be formed to electrophotographic photoreceptor 413. Electrophotographic photoreceptor 413 is a negatively chargeable organic photoreceptor having photoconductivity. Electrophotographic photoreceptor 413 is charged by charging apparatus 414.

Developing apparatus 412 is a developing apparatus of a two-component developing system. Developing apparatus 412 includes, for example: a developer container that stores a two-component developer; a developing roller (magnetic roller) rotatably disposed at an opening section of the developer container; a partition wall that partitions the inside of the developer container such that the two-component developer can communicate with the partition wall; a conveyance roller for conveying the two-component developer on a side of the opening section in the developer container toward the developing roller; and a stirring roller that stirs the two-component developer in the developer container. The developing container stores, for example, the two-component developer.

Intermediate transfer unit 42 includes intermediate transfer belt (intermediate transfer member) 421, primary transfer roller 422 that brings intermediate transfer belt 421 into pressure-contact with electrophotographic photoreceptor 413, a plurality of support rollers 423 including backup roller 423A, and belt cleaning apparatus 426. Intermediate transfer belt 421 is stretched in a loop shape over the plurality of support rollers 423. The rotation of at least one driving roller of the plurality of support rollers 423 causes intermediate transfer belt 421 to run in the direction of arrow A at a constant speed.

Belt cleaning apparatus 426 includes elastic member **426*a*. Elastic member 426*a* abuts on intermediate transfer belt 421 after the secondary transfer to remove an attached substance on the surface of intermediate transfer belt 421. Elastic member 426*a*** is constituted by an elastic body, and includes a cleaning blade, a brush, and the like.

Secondary transfer unit 43 includes secondary transfer belt 432 having an endless shape and a plurality of support rollers 431 including secondary transfer roller 431A. Secondary transfer belt 432 is stretched in a loop shape by secondary transfer roller 431A and support rollers 431.

Fixing section 60 includes fixing belt 61 (annular belt), heater 62 (heating member), and pressure roller 63 (facing member).

Heater 62 is disposed on a side of an inner circumferential surface of fixing belt 61, and heats fixing belt 61 from the inner circumferential side. Heater 62 is a pad member having a substantially rectangular parallelepiped shape and presses fixing belt 61 with one face of the rectangular parallelepiped to form a fixing nip having a face shape.

Pressure roller 63 (facing member) is disposed on a side of an outer circumferential surface of fixing belt 61, and faces heater 62 via fixing belt 61.

A nip section is formed between an outer peripheral surface of fixing belt 61 and pressure roller 63. Thus, fixing section 60 fixes a toner image on recording medium S to be conveyed, in a position in which pressure roller 63 faces heater 62. Specifically, when recording medium S passes through the nip section, fixing section 60 applies heat and pressure to a toner image to fix the toner image on recording medium S. Fixing section 60 configured in such a manner is also referred to as a surf fixing system.

A lubricating sheet (not illustrated) may be interposed between heater 62 and fixing belt 61 to allow fixing belt 61 to rotate smoothly. The lubricating sheet can be, for example, a 100 μm-thick polytetrafluoroethylene (PTFE)-coated polyimide sheet.

Image forming apparatus 1 further includes image reading section 70, image processing section 30, and conveyance section 50. Image reading section 70 includes sheet feeding apparatus 71 and scanner 72. Conveyance section 50 includes sheet feed section 51, sheet discharge section 52, and conveyance path section 53. Each of recording medium S identified on the basis of a basis weight, a size, and the like is stored per preset sheet type in each of three sheet feed tray units 51*a* to 51*c* constituting sheet feed section 51. Conveyance path section 53 includes a plurality of conveyance roller pairs such as registration roller pair 53*a*.

Image forming apparatus 1 configured as described above performs each process to be described later under the control of a control section (not illustrated).

The type of recording medium S is not particularly limited and may be a sheet, a film label, or a film. A film label refers to one to which a release sheet is adhered, and a film refers to one to which neither a release sheet nor an adhesive is adhered.

Examples of the film and a film portion of the film label include a polypropylene film, a polyethylene film, a polyvinyl chloride film, a polyethylene terephthalate film, a polystyrene film, a polyester film, and a polylactic acid film. Among these, a polypropylene film or a polyethylene terephthalate film is preferable from the viewpoint of versatility and the like.

Polypropylene films and polyethylene terephthalate films are used for various labels, packages, and the like. These films may be subjected to surface treatment as appropriate for the purpose of improving printability. Furthermore, these films may be transparent films, may contain a pigment or the like and have an arbitrary color such as white, and may have a toner receiving layer formed on the surface.

[Image Forming Method]

Next, a method for forming a full-color image by using the image forming apparatus will be specifically described.

Scanner 72 optically scans and reads document D on a contact glass. Reflected light from document D is read by CCD sensor 72*a* and becomes input image data. The input image data undergoes predetermined image processing in image processing section 30 and is sent to exposure apparatus 411.

Electrophotographic photoreceptor 413 rotates at a constant circumferential speed. Charging apparatus 414 uniformly charges the surface of electrophotographic photoreceptor 413 to the negative polarity (charging process). In exposure apparatus 411, a polygon mirror of a polygon motor rotates at a high speed, a laser beam corresponding to the input image data of each color component spreads along the axial direction of electrophotographic photoreceptor 413, and is emitted onto an outer circumferential surface of electrophotographic photoreceptor 413 along the axial direction. Thus, an electrostatic latent image is formed on the surface of electrophotographic photoreceptor 413 (exposure process).

In developing apparatus 412, toner base particles are charged as the two-component developer in the developing container is stirred and conveyed, the two-component developer is conveyed to the developing roller, and a magnetic brush is formed on the surface of the developing roller. The charged toner base particles are electrostatically attached from the magnetic brush to a portion of the electrostatic latent image on electrophotographic photoreceptor 413. Thus, the electrostatic latent image on the surface of electrophotographic photoreceptor 413 is visualized, and a toner image corresponding to the electrostatic latent image is formed on the surface of electrophotographic photoreceptor 413 (development process). Note that, the term "toner image" refers to a state in which the toner is gathered in an image shape.

The toner image on the surface of electrophotographic photoreceptor 413 is transferred to intermediate transfer belt 421 by intermediate transfer unit 42. The transfer residual toner remaining on the surface of electrophotographic photoreceptor 413 after the transfer is removed by drum cleaning apparatus 415 including a drum cleaning blade and is brought into sliding contact with the surface of electrophotographic photoreceptor 413.

Intermediate transfer belt 421 is brought into pressure-contact with electrophotographic photoreceptor 413 by primary transfer roller 422, and thus, a primary transfer nip is formed for each electrophotographic photoreceptor by electrophotographic photoreceptor 413 and intermediate transfer belt 421. At the primary transfer nips, the respective color toner images are sequentially transferred onto intermediate transfer belt 421 in a superposed manner (primary transfer process). In the present embodiment, when intermediate transfer belt 421 is conveyed in the direction of arrow A, the respective color toner images are transferred in the order of Y, M, C, K, and W (see FIG. 2).

On the other hand, secondary transfer roller 431A is brought into pressure-contact with backup roller 423A via intermediate transfer belt 421 and secondary transfer belt 432. Thus, a secondary transfer nip is formed by intermediate transfer belt 421 and secondary transfer belt 432. Recording medium S passes through the secondary transfer nip. Recording medium S is conveyed to the secondary transfer nip by conveyance section 50. Correction of the inclination of recording medium S and adjustment of conveyance timing are performed by a registration roller section in which registration roller pair 53*a* is arranged.

When recording medium S is conveyed to the secondary transfer nip, a transfer bias is applied to secondary transfer roller 431A. With the application of the transfer bias, a toner image borne on intermediate transfer belt 421 is transferred onto recording medium S (process of forming a toner image on the recording medium). In the present embodiment, the respective color toner images are transferred onto recording medium S in the order of W, K, C, M, and Y (see FIG. 2).

In this way, the white toner image and the color toner image are transferred onto recording medium S in this order in a superposed manner. Thus, a toner image (toner layer T) in which the white toner image and the color toner image are disposed in a superposed manner in this order is formed on recording medium S (see FIG. 1B).

Adhesion amount Mw of the white toner image is preferably, for example, 5 $g/m^2$ or more and 10 $g/m^2$ or less. Adhesion amount Mc of the color toner image can be, for example, 4 $g/m^2$ or more and 10 $g/m^2$ or less.

The total adhesion amount of the white toner image and the color toner image is, for example, preferably 9 $g/m^2$ or more and 20 $g/m^2$ or less, and more preferably 12 $g/m^2$ or more and 18 $g/m^2$ or less. When the total amount is equal to or more than the lower limit value, an image of a higher density can be formed, and when the total amount is equal to or less than the upper limit value, the fixability with respect to a recording medium is more easily maintained.

The ratio of adhesion amount Mw of the white toner image to adhesion amount Mc of the color toner image depends on the required color developability and the like, but is preferably Mw/Mc=0.5 or more and 2.2 or less. When the Mw/Mc is 0.5 or more, the color developability of an image is more easily enhanced. When Mw/Mc is 2.2 or less, the adhesion amount of the color toner which is easily melted is further increased, and thus, the low-temperature fixability is further easily enhanced, and the image blister due to the unevenness of the particles which are not melted is further easily reduced.

Recording medium S onto which a toner image has been transferred is conveyed toward fixing section 60 by secondary transfer belt 432.

Next, the recording medium is sent to fixing section 60 and a full-color toner image is fixed onto the recording medium (process of fixing the toner image onto the recording medium).

In the present embodiment, recording medium S on which a toner image is formed is nipped by fixing section 60 between fixing belt 61 and pressure roller 63 which faces heater 62 via fixing belt 61. Specifically, a fixing nip is formed with fixing belt 61 that rotates is held in between, and recording medium S that has been conveyed is heated and pressurized in a fixing nip section. Thereby fixing a toner image on recording medium S The heating temperature of the toner image is preferably 130° C. or more and 170° C. or less, and more preferably 130° C. or more and 150° C. or less. When the heating temperature is within the above range, the toner image can be fixed at a low temperature to the extent that the fixing performance of the toner image is not impaired. The heating temperature can be confirmed as a set temperature of heater 62.

Recording medium S on which a toner image has been fixed is ejected to the outside of the apparatus by sheet ejection section 52 including sheet ejection rollers 52*a*.

An attached substance, such as transfer residual toner, which is remaining on the surface of intermediate transfer belt 421 after the secondary transfer is removed by belt cleaning apparatus 426 including a cleaning blade that is brought into sliding contact with the surface of intermediate transfer belt 421. At this time, since the above-described intermediate transfer member is used as the intermediate transfer belt, a dynamic friction force can be reduced with time.

As described above, in the embodiment described above, an image is formed by a method including: 1) forming, on a recording medium, a toner image including a white toner image and a color toner image disposed on the white toner image; and 2) fixing the formed toner image onto the recording medium. Then, in the fixing of the toner image onto the recording medium in 2), recording medium S on which the toner image is formed is nipped between fixing belt 61 and pressure roller 63 facing heater 62 via fixing belt 61, and the toner image is fixed onto recording medium S. Then, the white toner and the color toners satisfy the relationships of the above-described expression 1.

Thus, while the surface of the toner layer has a low viscosity and melts, the inside of the toner layer is not completely melted and is in a state where voids are maintained between particles to some extent. Thus, a friction force generated at the nip section is likely to be dispersed in a contact portion between toner base particles, and is reduced. As a result, it is possible to prevent image surface roughness and to suppress breakage of the fixing belt.

Note that, the above-described image forming apparatus and image forming method are exemplary embodiments for implementing the present invention, and the present invention is not limited thereto.

For example, although the image forming apparatus in the above-described embodiment is an example of a tandem-type image forming apparatus constituted by five types of developing apparatuses for yellow, magenta, cyan, black, and white and five electrophotographic photoreceptors provided for the respective colors, the present invention is not limited thereto and the image forming apparatus may be a five-cycle-type image forming apparatus constituted by five types of developing apparatuses for yellow, magenta, cyan, black, and white and one electrophotographic photoreceptor.

Further, in the above-described embodiment, as developing apparatus 412, a developing apparatus of a two-component developing system is used, but the present invention is not limited thereto, and a developing apparatus of a one-component developing system may be used.

EXAMPLES

Hereinafter, the present invention will be described with reference to Example. The scope of the present invention is not construed limitedly by Examples.

1. Materials for Toner 1-1. Amorphous Polyester Resin (for White Toner)

Production Example of Amorphous Polyester Resin SA1

Terephthalic acid: 40.2 parts

Propylene oxide adduct of bisphenol A (BPA-PO): 29.0 parts

Dipropanol: 30.8 parts

Tin 2-ethylhexanoate (esterification catalyst): 0.5 parts

The materials described above were weighed in a reaction tank equipped with a cooling tube, a stirrer, a nitrogen introduction tube, and a thermocouple.

After replacing the inside of the reaction tank with nitrogen gas, the temperature was gradually raised while stirring, and the materials were allowed to react for 3 hours while stirring at a temperature of 140° C.

Next, the pressure in the reaction tank was lowered to 8.0 kPa, and the temperature was raised to 200° C. while stirring, followed by a reaction for 4 hours.

Thereafter, the pressure in the reaction tank was reduced again to 5 kPa or lower, and the intermediate product was allowed to react at 200° C. for 3 hours, thereby obtaining amorphous polyester SA1.

Production Example of Amorphous Polyester Resin SA2

Terephthalic acid: 40.2 parts

Propylene oxide adduct of bisphenol A (BPA-PO): 29.0 parts

Dipropanol: 30.8 parts

Tin 2-ethylhexanoate (esterification catalyst): 0.5 parts

The materials described above were weighed in a reaction tank equipped with a cooling tube, a stirrer, a nitrogen introduction tube, and a thermocouple.

After replacing the inside of the reaction tank with nitrogen gas, the temperature was gradually raised while stirring, and the materials were allowed to react for 3 hours while stirring at a temperature of 140° C.

Next, the pressure in the reaction tank was lowered to 8.0 kPa, and the temperature was raised to 200° C. while stirring, followed by a reaction for 6 hours.

Thereafter, the pressure in the reaction tank was reduced again to 5 kPa or lower, and the intermediate product was allowed to react at 200° C. for 5 hours, thereby obtaining amorphous polyester SA2.

Production Example of Amorphous Polyester Resin SA3 (Dispersion)

A reaction tank equipped with a cooling tube, a stirrer, and a nitrogen introduction tube was charged with 25.3 parts of terephthalic acid, 5.6 parts of adipic acid, 30.9 parts of an ethylene oxide 2.2 mol adduct of bisphenol A, 34.3 parts of a propylene oxide 2.2 mol adduct of bisphenol A, and 0.2 parts of dibutyltin oxide. The materials were allowed to react under normal pressure at 230° C. for 3 hours. Thereafter, 4 parts of trimellitic acid were charged, and were allowed to react with the intermediate product further for 2 hours. Thereafter, the intermediate product was allowed to react for 5 hours under a reduced pressure of 10 to 15 mmHg to obtain an amorphous polyester.

100 parts of the amorphous polyester resin were dissolved in 90 parts of acetone to obtain an acetone solution. 180 parts of the resulting acetone solution were mixed with 720 parts of water, and the mixture was mixed with a TK homomixer at 8000 rpm for 1 minute. Thereafter, the dispersion was decompressed to volatilize and remove acetone, thereby obtaining amorphous polyester resin dispersion SA3.

Production Example of Amorphous Polyester Resin SA4 (Dispersion)

A reaction tank equipped with a cooling tube, a stirrer, and a nitrogen introduction tube was charged with 25.3 parts of terephthalic acid, 5.6 parts of adipic acid, 32.2 parts of an ethylene oxide 2.2 mol adduct of bisphenol A, 35.7 parts of a propylene oxide 2.2 mol adduct of bisphenol A, and 0.2 parts of dibutyltin oxide. The materials were allowed to react under normal pressure at 230° C. for 3 hours. Next, 4 parts of trimellitic acid were charged, and were allowed to react with the intermediate product further for 2 hours. Thereafter, the intermediate product was allowed to react under a reduced pressure of 10 to 15 mmHg for 5 hours. Thus, amorphous polyester SL1 was obtained.

Next, a reaction tank equipped with a cooling tube, a stirrer, and a nitrogen introduction tube was charged with 25.3 parts of terephthalic acid, 5.6 parts of adipic acid, 30.9 parts of an ethylene oxide 2.2 mol adduct of bisphenol A, 34.3 parts of a propylene oxide 2.2 mol adduct of bisphenol A, and 0.2 parts of dibutyltin oxide. The materials were allowed to react under normal pressure at 230° C. for 3 hours. Next, 4 parts of trimellitic acid were charged, and were allowed to react with the intermediate mixture further for 2 hours. Thereafter, the intermediate product was allowed to react under a reduced pressure of 10 to 15 mmHg for 5 hours. Thus, amorphous polyester SHI was obtained.

An acetone solution was obtained by dissolving 95 parts of amorphous polyester L1 and 5 parts of amorphous polyester H1 in 90 parts of acetone. 180 parts of the resulting acetone solution and 720 parts of water were mixed, followed by mixing for 1 minute at 8000 rpm using a TK homomixer (manufactured by PRIMIX Corporation). Thereafter, the dispersion was decompressed to volatilize and remove acetone, thereby obtaining an amorphous polyester resin dispersion SA4.

1-2. Crystalline Polyester Resin (for White Toner)

Production Example of Crystallizable Polyester SB1

Adipic acid: 55.3 parts
Propylene oxide adduct of bisphenol A (BPA-PO): 44.7 parts
Tin 2-ethylhexanoate: 0.5 parts The materials described above were weighed in a reaction tank equipped with a cooling tube, a stirrer, a nitrogen introduction tube, and a thermocouple. After replacing the inside of the reaction tank with nitrogen gas, the temperature was gradually raised while stirring, and the materials were allowed to react for 3 hours while stirring at a temperature of 140° C. Next, the pressure in the reaction tank was lowered to 8.3 kPa, and the temperature was raised to 200° C. while stirring, followed by a reaction for 1 hour. Thus, crystallizable polyester SB1 was obtained.

Production Example of Crystalline Polyester SB2

Adipic acid: 55.3 parts
Propylene oxide adduct of bisphenol A (BPA-PO): 44.7 parts
Tin 2-ethylhexanoate: 0.5 parts The materials described above were weighed in a reaction tank equipped with a cooling tube, a stirrer, a nitrogen introduction tube, and a thermocouple. After replacing the inside of the reaction tank with nitrogen gas, the temperature was gradually raised while stirring, and the materials were allowed to react for 3 hours while stirring at a temperature of 150° C. Next, the pressure in the reaction tank was lowered to 8.3 kPa, the temperature was raised to 200° C. while stirring, and the intermediate product was allowed to react for 3 hours to obtain crystalline polyester SB2.

(Production Example of Crystalline Polyester SB3)

A reaction vessel equipped with a cooling tube, a stirrer, and a nitrogen introduction tube was charged with 682 parts of an ethylene oxide 2 mol adduct of bisphenol A, 81 parts of a propylene oxide 2 mol adduct of bisphenol A, 283 parts of terephthalic acid, 22 parts of trimellitic anhydride, and 2 parts of dibutyltin oxide, and the materials were allowed to react under normal pressure at 230° C. for 8 hours. Next, the intermediate product was allowed to react under a reduced pressure of 10 to 15 mmHg for 5 hours to synthesize an intermediate polyester. The resulting intermediate polyester had a number average molecular weight (Mn) of 2100, a weight average molecular weight (Mw) of 9600, a glass transition temperature (Tg) of 55° C., an acid number of 0.5 mgKOH/g, and a hydroxyl value of 49 mgKOH/g.

Next, a reaction vessel equipped with a cooling tube, a stirrer, and a nitrogen introduction tube was charged with 411 parts of the intermediate polyester, 89 parts of isophorone diisocyanate, and 500 parts of ethyl acetate, and the materials were allowed to react at 100° C. for 5 hours to synthesize prepolymer 1. The resulting prepolymer 1 had a free isocyanate content of 1.60%, and the solid content concentration (at 150° C., after standing for 45 minutes) of prepolymer 1 was 50%.

A 5 L four-necked flask equipped with a nitrogen introduction tube, a dewatering tube, a stirrer, and a thermocouple was charged with 63.1 parts of sebacic acid and 36.9 parts of 1,6-hexanediol. Next, after a reaction with titanium tetraisopropoxide (500 ppm with respect to the resin component) at 180° C. for 10 hours, the temperature was raised to 200° C. and the intermediate product was allowed to react for 3 hours, and was allowed to react further at a pressure of 8.3 kPa for 2 hours to obtain crystallizable polyester C1.

A vessel equipped with a stirrer and a thermometer was charged with 25 parts of crystalline polyester SB3 and 75 parts of ethyl acetate, and then the temperature was raised to 80° C. while stirring to dissolve crystalline polyester SB3. Thereafter, the mixture was cooled to 30° C., and then dispersed by using a bead mill: ultravisco mill (manufactured by AIMEX Co., Ltd.) under the conditions of a liquid feed rate of 1 kg/h, a disc circumferential speed of 6 m/s, filling with 80% by volume of zirconia beads having a diameter of 0.5 mm, and 3 passes, to obtain crystalline polyester resin dispersion SB3.

1-3. Amorphous Polyester Resin (for Color Toner)

Production Example of Amorphous Polyester Resin A1

Fumaric acid: 48.2 parts

Propylene oxide adduct of bisphenol A (BPA-PO): 21.0 parts

Dipropanol: 30.8 parts

Tin 2-ethylhexanoate (esterification catalyst): 0.5 parts

The materials described above were weighed in a reaction tank equipped with a cooling tube, a stirrer, a nitrogen introduction tube, and a thermocouple.

After replacing the inside of the reaction tank with nitrogen gas, the temperature was gradually raised while stirring, and the materials were allowed to react for 3 hours while stirring at a temperature of 140° C.

Next, the pressure in the reaction tank was lowered to 8.0 kPa, and the temperature was raised to 200° C. while stirring, followed by a reaction for 4 hours.

Thereafter, the pressure in the reaction tank was reduced again to 5 kPa or lower, and the intermediate product was allowed to react at 200° C. for 3 hours, thereby obtaining amorphous polyester A1.

Production Example of Amorphous Polyester Resin A2

Fumaric acid: 48.2 parts

Propylene oxide adduct of bisphenol A (BPA-PO): 21.0 parts

Dipropanol: 30.8 parts

Tin 2-ethylhexanoate (esterification catalyst): 0.5 parts

The materials described above were weighed in a reaction tank equipped with a cooling tube, a stirrer, a nitrogen introduction tube, and a thermocouple.

After replacing the inside of the reaction tank with nitrogen gas, the temperature was gradually raised while stirring, and the materials were allowed to react for 3 hours while stirring at a temperature of 150° C.

Next, the pressure in the reaction tank was lowered to 8.0 kPa, and the temperature was raised to 200° C. while stirring, followed by a reaction for 4 hours.

Thereafter, the pressure in the reaction tank was reduced again to 5 kPa or lower, and the intermediate product was allowed to react at 200° C. for 5 hours, thereby obtaining amorphous polyester A2.

Production Example of Amorphous Polyester Resin A3

—Synthesis of Amorphous (Low Molecular Weight) Polyester Resins L1—

A reaction tank equipped with a cooling tube, a stirrer, and a nitrogen introduction tube was charged with 25.3 parts of terephthalic acid, 5.6 parts of adipic acid, 32.2 parts of an ethylene oxide 2.2 mol adduct of bisphenol A, 35.7 parts of a propylene oxide 2.2 mol adduct of bisphenol A, and 0.2 parts of dibutyltin oxide. The materials were allowed to react under normal pressure at 230° C. for 4 hours. Thereafter, the intermediate product was allowed to react under a reduced pressure of 10 mmHg to 15 mmHg for 5 hours. Thus, amorphous polyester L1 was obtained.

—Synthesis of Amorphous (Low Molecular Weight) Polyester Resins H1—

A reaction tank equipped with a cooling tube, a stirrer, and a nitrogen introduction tube was charged with 25.3 parts of terephthalic acid, 5.6 parts of adipic acid, 30.9 parts of an ethylene oxide 2.2 mol adduct of bisphenol A, 34.3 parts of a propylene oxide 2.2 mol adduct of bisphenol A, and 0.2 parts of dibutyltin oxide. The materials were allowed to react under normal pressure at 230° C. for 3 hours. Thereafter, 4 parts of trimellitic acid were charged, and were allowed to react with the intermediate product further for 2 hours. Thereafter, the intermediate product was allowed to react under a reduced pressure of 10 mmHg to 15 mmHg for 5 hours. Thus, amorphous polyester H1 was obtained.

—Preparation of Amorphous Polyester Resin Dispersion—

An acetone solution was obtained by dissolving 95 parts of amorphous polyester L1 and 5 parts of amorphous polyester H1 in 90 parts of acetone. 180 parts of the resulting acetone solution and 720 parts of water were mixed, followed by mixing for 1 minute at 8000 rpm using a TK homomixer (manufactured by PRIMIX Corporation). Thereafter, the dispersion was depressurized, the acetone was volatilized and removed, and amorphous polyester resin dispersion A3 was obtained.

1-4. Crystalline Polyester Resin (for Color Toner)

Production Example of Crystallizable Polyester B1

Fumaric acid: 48.3 parts

Propylene oxide adduct of bisphenol A (BPA-PO): 51.7 parts

Tin 2-ethylhexanoate: 0.5 parts

The materials described above were weighed in a reaction tank equipped with a cooling tube, a stirrer, a nitrogen introduction tube, and a thermocouple. After replacing the inside of the reaction tank with nitrogen gas, the temperature was gradually raised while stirring, and the materials were allowed to react for 3 hours while stirring at a temperature of 140° C. Next, the pressure in the reaction tank was reduced to 8.3 kPa, the temperature was raised to 200° C. while stirring, and the intermediate product was allowed to react for 1 hour to obtain crystalline polyester B1.

Production Example of Crystalline Polyester B2

Fumaric acid: 48.3 parts

Propylene oxide adduct of bisphenol A (BPA-PO): 51.7 parts

Tin 2-ethylhexanoate: 0.5 parts

The materials described above were weighed in a reaction tank equipped with a cooling tube, a stirrer, a nitrogen introduction tube, and a thermocouple. After replacing the inside of the reaction tank with nitrogen gas, the temperature was gradually raised while stirring, and the materials were allowed to react for 3 hours while stirring at a temperature of 150° C. Then, the pressure in the reaction tank was reduced to 8.3 kPa, the temperature was raised to 200° C. while stirring, and the intermediate product was allowed to react for 3 hours to obtain crystalline polyester B2.

(Production Example of Crystalline Polyester B3 Dispersion)

A reaction vessel equipped with a cooling tube, a stirrer, and a nitrogen introduction tube was charged with 682 parts of an ethylene oxide 2 mol adduct of bisphenol A, 81 parts of a propylene oxide 2 mol adduct of bisphenol A, 283 parts of terephthalic acid, 22 parts of trimellitic anhydride, and 2 parts of dibutyltin oxide, and the materials were allowed to react mixture was allowed to react under normal pressure at 230° C. for 8 hours. Next, the intermediate product was allowed to react under a reduced pressure of 10 mmHg to 15 mmHg for 5 hours to synthesize an intermediate polyester. The resulting intermediate polyester had a number average molecular weight (Mn) of 2100, a weight average weight (Mw) of 9600, a glass transition temperature (Tg) of 55° C., an acid number of 0.5 mgKOH/g, and a hydroxyl value of 49 mgKOH/g.

Next, a reaction vessel equipped with a cooling tube, a stirrer, and a nitrogen introduction tube was charged with 411 parts of the intermediate polyester, 89 parts of isophorone diisocyanate, and 500 parts of ethyl acetate, and the materials were allowed to react at 100° C. for 5 hours to synthesize prepolymer 1. The resulting prepolymer 1 had a free isocyanate content of 1.60%, and the solid content concentration (at 150° C., after standing for 45 minutes) of prepolymer 1 was 50%.

A 5 L four-necked flask equipped with a nitrogen introduction tube, a dewatering tube, a stirrer, and a thermocouple was charged with 63.1 parts of sebacic acid and 36.9 parts of 1,6-hexanediol. Next, after a reaction with titanium tetraisopropoxide (500 ppm with respect to the resin component) at 180° C. for 10 hours, the temperature was raised to 200° C. and the intermediate product was allowed to react for 3 hours, and was allowed to react further at a pressure of 8.3 kPa for 2 hours to obtain crystalline polyester resin B3.

A vessel equipped with a stirring rod and a thermometer was charged with 25 parts of crystalline polyester B3 and 75 parts of ethyl acetate, and then the temperature was raised to 80° C. while stirring to dissolve crystalline polyester B3. Thereafter, the mixture was cooled to 30° C., and then dispersed by using a bead mill: ultravisco mill (manufactured by AIMEX Co., Ltd.) under the conditions of a liquid feed rate of 1 kg/h, a disc circumferential speed of 7 m/s, filling with 80% by volume of zirconia beads having a diameter of 0.5 mm, and 3 passes, to obtain crystalline polyester resin dispersion B3.

2 Preparation of Toner 2-1. Preparation of White Toner (Preparation of White Toner S1)

Amorphous polyester resin SA1: 55 parts
Crystalline polyester SB1: 45 parts
Diester wax: 5 parts (melting point: 95° C.)
Titanium oxide (white colorant): 45 parts The above materials were mixed with a Henschel mixer at a speed of 40 $m \cdot s^{-1}$ for a rotation time of 5 min.

Thereafter, the mixture was kneaded with a twin-screw kneader set at a temperature of 130° C. The resulting kneaded product was cooled and coarsely pulverized to 1 mm or less with a hammer mill to obtain a coarsely pulverized product. The resulting coarsely pulverized product was finely pulverized with a mechanical pulverizer. Thereafter, the finely pulverized precursor was classified for 20 minutes using a fine powder classifier (Faculty manufactured by Hosokawa Micron Corporation) under conditions of a classification rotor rotation speed of 130 $s^{-1}$ and a dispersion rotor rotation speed of 120 $s^{-1}$ to obtain particles having a volume-based median diameter of 7.3 μm.

The classified particles were dried with an air flow drying apparatus. The operation conditions were a hot air temperature=130° C. and a drying time of 30 minute to obtain white toner base particles.

Thereafter, 1.0 part by mass of hydrophobic silica particles A (number average primary particle diameter: 16 nm, degree of hydrophobicity: 68) and 1.5 parts by mass of large-diameter silica particles B (number average primary particle diameter: 50 nm) were added to 100 parts of white toner base particles, and the particles were mixed with a Henschel mixer for 1 minute at a peripheral speed of 35 m/s, followed by a pause and further mixing for 5 minutes. The mixture was sieved using a mesh having an opening of 43 μm to obtain white toner particles S1.

(Preparation of White Toners S2, S3, and S8)

White toners S2, S3, and S8 were produced in the same manner as white toner S1 except that in the preparation of white toner S1, the contents of the amorphous polyester resins and the crystalline polyester resins were changed as illustrated in Table 1.

(Preparation of White Toners S4 and S6)

White toners S4 and S6 were prepared in the same manner as white toner S1 except that in the preparation of white toner S1, the drying conditions were changed as illustrated in Table 1.

(Preparation of White Toner S5)

White toner S5 was prepared in the same manner as white toner S1 except that in the preparation of white toner S1, the types of the amorphous polyester resins and the crystalline polyester resins were changed as illustrated in Table 1.

(Production of White Toner S7)

100 parts of amorphous polyester resin dispersion SA3, 120 parts of crystalline polyester resin dispersion SB3, 125 parts of a wax dispersion, 12 parts of a masterbatch of an organic-modified layered inorganic compound, 60 parts of titanium dioxide, and 63 parts of ethyl acetate were mixed, and the mixture was mixed using a homomixer at 6000 rpm for 120 minutes to obtain oil phase 01 (solid content: 50%).

A container equipped with a stirrer and a thermometer was charged with 180 parts of the water phase, and then held at 20° C. on a water bath. Next, 5 parts of modified prepolymer 1 were added to 111 parts of oil phase 01 maintained at 20° C., and oil phase 01 was charged into the water phase. While maintaining the temperature at 20° C., mixing was performed for 2 minutes at 6000 rpm using a TK homomixer to obtain an emulsified slurry. The emulsified slurry was placed in a container equipped with a stirrer and a thermometer, and then the solvent was removed under a reduced pressure at 40° C. to obtain a slurry of 80% in terms of the solid content in oil droplets.

While maintaining the resulting slurry at 40° C., the slurry was mixed at 6000 rpm for 5 minutes using a TK homomixer, a shear stress was applied to the slurry, and the solvent was removed at 40° C. under a reduced pressure to obtain a slurry having an organic solvent volatile content of 0%.

Next, the resulting slurry was cooled to room temperature, and then vacuum filtration was performed. To the filter cake, 200 parts of ion-exchanged water were added, mixing was performed using Three-one motor (manufactured by Shinto Scientific Co., Ltd.) at 800 rpm for 5 minutes, and after reslurrying, filtering was performed. Furthermore, 10 parts of a 1% by mass aqueous sodium hydroxide solution and 190 parts of ion-exchanged water were added to the filter cake, and reslurrying was performed in the same manner and then filtering was performed. Next, 10 parts of 1% by mass hydrochloric acid and 190 parts of ion-exchanged water were added to the filter cake, and reslurrying was performed in the same manner and then filtering was performed. Furthermore, an operation of adding 300 parts of ion-exchanged water to the filter cake, performing reslurrying, and then performing filtering was repeated twice.

Using an air-circulating dryer, the filter cake was passed through a mesh having an opening of 2 mm, then dried at 45° C. for 96 hours, and sieved using a mesh having an opening of 75 μm to obtain core-shell type toner base particles in which the core was composed of crystalline polyester SB3 and the shell was composed of amorphous polyester SA3.

(Preparation of White Toner S9)

100 parts of amorphous polyester resin dispersion SA3, 120 parts of crystalline polyester resin dispersion SB3, 125 parts of a wax dispersion, 12 parts of a masterbatch of an organic-modified layered inorganic compound, 60 parts of titanium dioxide, and 63 parts of ethyl acetate were mixed, and the mixture was mixed using a homomixer at 6000 rpm for 120 minutes to obtain oil phase 01 (solid content: 50%).

A container equipped with a stirrer and a thermometer was charged with 180 parts of the water phase, and then held at 20° C. on a water bath. Next, 5 parts of modified prepolymer 1 were added to 111 parts of oil phase 01 maintained at 20° C., and oil phase 01 was charged into the water phase. While maintaining the temperature at 20° C., mixing was performed for 2 minutes at 8000 rpm using a TK homomixer to obtain an emulsified slurry. The emulsified slurry was placed in a container equipped with a stirrer and a thermometer, and then the solvent was removed under a reduced pressure at 40° C. to obtain a slurry of 80% in terms of the solid content in oil droplets.

While maintaining the resulting slurry at 40° C., mixing was performed for 5 minutes at 8000 rpm using a TK homomixer, shear stress was applied to the slurry, and the solvent was removed under a reduced pressure at 40° C. to obtain a slurry having an organic solvent volatile content of 0%.

Next, the resulting slurry was cooled to room temperature, and then vacuum filtration was performed. To the filter cake, 200 parts of ion-exchanged water were added, mixing was performed using Three-one motor (manufactured by Shinto Scientific Co., Ltd.) at 800 rpm for 5 minutes, and after reslurrying, filtering was performed. Furthermore, 10 parts of a 1% by mass aqueous sodium hydroxide solution and 190 parts of ion-exchanged water were added to the filter cake, and reslurrying was performed in the same manner and then filtering was performed. Next, 10 parts of 1% by mass hydrochloric acid and 190 parts of ion-exchanged water were added to the filter cake, and reslurrying was performed in the same manner and then filtering was performed. Furthermore, an operation of adding 300 parts of ion-exchanged water to the filter cake, performing reslurrying, and then performing filtering was repeated twice.

The filter cake was dried without being crushed as it was at 45° C. for 48 hours using an air-circulating dryer, and then sieved using a mesh having an opening of 75 μm to obtain core-shell type toner base particles in which the core was composed of crystalline polyester SB3 and the shell was composed of amorphous polyester SA3.

(Preparation of White Toner S10)

White toner S10 was produced in the same manner as the white toner S1 except that in the production of white toner S1, the classification time of a fine powder classifier (Faculty manufactured by Hosokawa Micron Corporation) was changed to 10 minutes such that the final average circularity was 0.910.

(Preparation of White Toner S11)

100 parts of amorphous polyester resin dispersion SA4, 20 parts of crystalline polyester resin dispersion SB3, 25 parts of a wax dispersion, 12 parts of a masterbatch of an organic-modified layered inorganic compound, 60 parts of titanium dioxide, and 63 parts of ethyl acetate were mixed, and the mixture was mixed using a homomixer at 6000 rpm for 120 minutes to obtain an oil phase (solid content: 50%).

A container equipped with a stirrer and a thermometer was charged with 174 parts of the water phase and then held at 20° C. on a water bath. Next, 5 parts of modified prepolymer 1 were added to 111 parts of the oil phase maintained at 20° C., and the oil phase was charged into the water phase. While maintaining the temperature at 20° C., mixing was performed for 2 minutes at 8000 rpm using a TK homomixer to obtain an emulsified slurry. The emulsified slurry was placed in a container equipped with a stirrer and a thermometer, and then the solvent was removed under a reduced pressure at 40° C. to obtain a slurry of 80% in terms of the solid content in oil droplets.

While maintaining the resulting slurry at 40° C., mixing was performed for 5 minutes at 8000 rpm using a TK homomixer, shear stress was applied to the slurry, and the solvent was removed under a reduced pressure at 40° C. to obtain a slurry having an organic solvent volatile content of 0%.

Next, the resulting slurry was cooled to room temperature, and then vacuum filtration was performed. To the filter cake, 200 parts of ion-exchanged water were added, mixing was performed using Three-one motor (manufactured by Shinto Scientific Co., Ltd.) at 800 rpm for 5 minutes, and after reslurrying, filtering was performed. Furthermore, 10 parts of a 1% by mass aqueous sodium hydroxide solution and 190 parts of ion-exchanged water were added to the filter cake, and reslurrying was performed in the same manner and then filtering was performed. Next, 10 parts of 1% by mass hydrochloric acid and 190 parts of ion-exchanged water were added to the filter cake, and reslurrying was performed in the same manner and then filtering was performed. Furthermore, an operation of adding 300 parts of ion-exchanged water to the filter cake, performing reslurrying, and then performing filtering was repeated twice.

The filter cake was dried without being crushed as it was at 45° C. for 48 hours using a wind-circulation dryer, and then sieved using a mesh having an opening of 75 μm to obtain core-shell type toner base particles in which the core was composed of a crystalline polyester and the shell was composed of an amorphous polyester.

2-2. Measurement of Physical Properties (Viscosity)

The viscosity of the white toner was measured using a flowtester (apparatus name: CFT-500 manufactured by Shimadzu Corporation) under the following conditions and procedures.

First, a cylinder maintained warm at 50° C. was charged with 1.1 g of the white toner in a powder state as it was, and preheated with a warming time of 300 seconds.

Next, while heating at a rate of 6° C./min, the white toner was pressurized (a load of 2 kg was applied) with a plunger, and the molten white toner was injected into a cylindrical die hole (hole inner diameter: 1.0 mm, die length: 1.0 mm) provided in a lower portion of the cylinder.

Data until the elution was completely finished was measured, and the viscosity value when the temperature reached 110° C. was read and logarithmically converted to calculate log μ(W110).

(Average Circularity of Toner Particles)

Toner particles of the white toner were wetted in the surfactant solution, ultrasonic dispersion was performed for 1 minute to disperse the toner particles, and then the perimeter of a projected image of each particle was measured using a flow-type particle image analyzer "FPIA-3000" (manufactured by Sysmex Corporation) under measurement conditions of an HPF (high-power field imaging) mode at an appropriate density corresponding to an HPF detection number of 3000 to 10000. Then, the circularity of each particle was calculated based on the following expression:

Circularity=(Perimeter of a circle having the same projected area as a particle image)/(Perimeter of a projected image of the particle).

Then, the arithmetic average value obtained by adding up the circularities of the individual particles and dividing the sum by the total number of the measured particles was defined as the average circularity.

(Volume-Based Median Diameter (D50))

The volume-based median diameter (D50) was measured and calculated using, for example, an apparatus in which a computer system for data processing was connected to "Multisizer 3 (manufactured by Beckman Coulter, Inc.)".

First, 0.02 g of toner particles were caused to be intimate with 20 ml of a surfactant solution (a surfactant solution used for the purpose of dispersing toner particles and obtained, for example, by diluting a neutral detergent containing a surfactant component ten-fold with pure water), and then ultrasonic dispersion was performed for 1 minute to fabricate a toner particle dispersion.

This toner particle dispersion was injected with a pipette into a beaker held in a sample stand and containing ISOTON II (manufactured by Beckman Coulter, Inc.) until the measured concentration reached 5 to 10%, and the number of particles to be counted in a measuring machine was set to 25000 and the measurement was performed. Note that, Multisizer 3 having an aperture diameter of 100 μm was used. The range of measurement of 1 to 30 μm was divided into 256 sections, the number of frequency in each section was calculated, and the particle diameter when a cumulative volume fraction cumulated from the largest volume fraction was 50% was used as the volume-based median diameter (D50).

Table 1 illustrates the resin compositions, production conditions, and physical properties of white toners S1 to S11.

TABLE 1

| | Amorphous polyester | | Crystalline polyester | | | | | | |
|---|---|---|---|---|---|---|---|---|---|
| Toner No. | Type | Number of parts | Type | Number of parts | Fabrication method | Drying conditions | D50 (μm) | Average circularity | log μ(W110) |
| S1 | SA1 | 55 | SB1 | 45 | Dry type | Hot air treatment at 130° C., 30 minutes | 7.3 | 0.940 | 5 |
| S2 | SA1 | 70 | SB1 | 30 | Dry type | Hot air treatment at 130° C., 30 minutes | | 0.940 | 3.9 |
| S3 | SA1 | 80 | SB1 | 20 | Dry type | Hot air treatment at 130° C., 30 minutes | | 0.940 | 5.5 |
| S4 | SA1 | 55 | SB1 | 45 | Dry type | Hot air treatment at 130° C., 50 minutes | | 0.940 | 5 |
| S5 | SA2 | 55 | SB3 | 45 | Dry type | Hot air treatment at 130° C., 30 minutes | | 0.940 | 5 |
| S6 | SA1 | 55 | SB1 | 45 | Dry type | Wind-circulation dryer at 45° C./60 h drying | | 0.940 | 5 |
| S7 | SA3 | 100 | SB3 | 20 | Wet type | Wind-circulation dryer at 45° C./72 h drying | | 0.953 | 5 |
| S8 | SA1 | 95 | SB1 | 5 | Dry type | Hot air treatment at 130° C., 30 minutes | | 0.940 | 6 |
| S9 | SA3 | 100 | SB3 | 20 | Wet type | Wind-circulation dryer at 45° C./48 h drying | | 0.970 | 5 |
| S10 | SA1 | 55 | SB1 | 45 | Dry type | Hot air treatment at 130° C., 30 minutes | | 0.910 | 5 |
| S11 | SA4 | 100 | SB3 | 20 | Wet type | Wind-circulation dryer at 45° C./48 h drying | | 0.970 | 3 |

2-3. Preparation of Color Toner (Production of Color Toner Y1/M1/C1/B1)

Amorphous polyester resin Al: 60 parts
Crystalline polyester B1: 40 parts
Diester wax: 5 parts (melting point: 95° C.)
Colorant: 12 parts Note that, as the colorant, a yellow pigment (Pigment Yellow 74) was used for the preparation of the yellow toner, a magenta pigment (quinacridone) was used for the preparation of the magenta toner, a cyan pigment (phthalocyanine blue (C. I. Pigment Blue 15:3)) was used for the preparation of the cyan toner, and a black pigment (carbon black) was used for the preparation of the black toner.

The above materials were mixed with a Henschel mixer at a speed of 40 $m \cdot s^{-1}$ for a rotation time of 5 min. Thereafter, the mixture was kneaded with a twin-screw kneader set at a temperature of 130° C. The resulting kneaded product was cooled and coarsely pulverized to 1 mm or less with a hammer mill to obtain a coarsely pulverized product. The resulting coarsely pulverized product was finely pulverized with a mechanical pulverizer. Thereafter, the finely pulverized precursor was classified using an air classifier to obtain particles having a volume-based median diameter of 6.4 μm.

The classified particles were dried with an air flow drying apparatus. The operation conditions were a hot air temperature=130° C. and a drying time of 30 minutes to obtain color toner base particles.

Thereafter, 1.0 part by mass of hydrophobic silica particles A (number average primary particle diameter: 16 nm, degree of hydrophobicity: 68) and 1.5 parts by mass of large-diameter silica particles B (number average primary particle diameter: 50 nm) were added to 100 parts of color toner base particles, and the particles were mixed with a Henschel mixer for 1 minute at a peripheral speed of 35 m/s, followed by a pause and further mixing for 5 minutes. The mixture was sieved using a mesh having an opening of 43 μm to obtain color toner particles Y1/M1/C1/B1.

(Production of Color Toners Y2/M2/C2/B2 to Y5/M5/C5/B5)

Color toners Y2/M2/C2/B2 to Y5/M5/C5/B5 were prepared in the same manner as color toner Y1/M1/C1/B1 except that in the preparation of color toner Y1/M1/C1/B1, the contents of the amorphous polyester resins and the crystalline polyester resins were changed as illustrated in Table 2.

(Preparation of Color Toners Y6/M6/C6/B6, Y8/M8/C8/B8, and Y10/M10/C10/B10)

Color toner Y6/M6/C6/B6, Y8/M8/C8/B8, and Y10/M10/C10/B10 were produced in the same manner as color toner Y1/M1/C1/B1 except that in the preparation of color toner Y1/M1/C1/B1, the drying conditions were changed as illustrated in Table 2.

(Preparation of Color Toner Y7/M7/C7/B7)

Color toners Y7/M7/C7/B7 were prepared in the same manner as color toner Y1/M1/C1/B1 except that in the preparation of color toner Y1/M1/C1/B1, the types of the amorphous polyester resins and the crystalline polyester resins were changed as illustrated in Table 2.

(Preparation of Color Toner Y9/M9/C9/B9)

—Preparation of Masterbatch of Yellow Pigment—

200 parts of water, 500 parts of C. I. Pigment Yellow 185 (Paliotol Yellow D1155 manufactured by BASF) and 500 parts of amorphous polyester L1 were mixed with a Henschel mixer (manufactured by Mitsui Mining Co., Ltd.).

The mixture was kneaded with two rolls at 120° C. for 30 minutes, rolled and cooled, and pulverized with a pulverizer to obtain [masterbatch 1 of the yellow pigment]. Note that, the procedure was the same for the other colors, and the coloring materials were as described above.

—Synthesis of Wax Dispersant 1—

A reaction tank equipped with a stirring rod and a thermometer was charged with 480 parts of xylene and 100 parts of paraffin wax HNP-9 (manufactured by Nippon Seiro Co., Ltd.) and heated until they were dissolved, then replacement with nitrogen was performed and the temperature was raised to 170° C. Next, a mixed liquid of 740 parts of styrene, 100 parts of acrylonitrile, 60 parts of butyl acrylate, 36 parts of di-t-butyl peroxy-hexahydro terephthalate, and 100 parts of xylene was added dropwise over 3 hours, and then was held at 170° C. for 30 minutes. Furthermore, the solvent was removed to obtain wax dispersant 1.

—Preparation of Masterbatch 1 of Organic-Modified Layered Inorganic Compound—

200 parts of water, 500 parts of an organic-modified layered inorganic compound (CLAYTONE-APA manufactured by BYK-Chemie GmbH), and 500 parts of amorphous polyester resins L1 were added and mixed with a Henschel mixer (manufactured by Nippon Coke & Engineering Co., Ltd.). The mixture was kneaded with two rolls at 120° C. for 30 minutes, rolled and cooled, and pulverized with a pulverizer to obtain [masterbatch 1 of the organic-modified layered inorganic compound]. Based on the above, a color toner was produced.

100 parts of amorphous polyester resin dispersion A3, 20 parts of crystalline polyester resin dispersion B3, 25 parts of wax dispersion W1, 2 parts of masterbatch 1 of the organic-modified layered inorganic compound, 12 parts of masterbatch 1 of the yellow pigment, and 69 parts of ethyl acetate were mixed, followed by mixing for 120 minutes at 6000 rpm using a TK homomixer (manufactured by PRIMIX Corporation) to obtain oil phase Y1 (solid content: 50%).

A container equipped with a stirrer and a thermometer was charged with 160.5 parts of the water phase and then held at 20° C. on a water bath. Next, 5 parts of modified prepolymer 1 were added to 102 parts of oil phase Y1 maintained at 20° C., and oil phase Y1 was charged into the water phase. While maintaining the temperature at 20° C., mixing was performed for 2 minutes at 8000 rpm using a TK homomixer (manufactured by PRIMIX Corporation) to obtain an emulsified slurry. The solvent was removed under a reduced pressure at 40° C. to obtain a slurry having an organic solvent volatile content of 0%.

Next, the resulting slurry was cooled to room temperature, and then vacuum filtration was performed. To the filter cake, 200 parts of ion-exchanged water were added, mixing was performed using Three-one motor (manufactured by Shinto Scientific Co., Ltd.) at 800 rpm for 5 minutes, and after reslurrying, filtering was performed. Furthermore, 10 parts of a 1% by mass aqueous sodium hydroxide solution and 190 parts of ion-exchanged water were added to the filter cake, and reslurrying was performed in the same manner and then filtering was performed. Next, 10 parts of 1% by mass hydrochloric acid and 190 parts of ion-exchanged water were added to the filter cake, and reslurrying was performed in the same manner and then filtering was performed. Furthermore, an operation of adding 300 parts of ion-exchanged water to the filter cake, performing reslurrying, and then performing filtering was repeated twice.

Using a wind-circulation dryer, the filter cake was passed through a mesh having an opening of 2 mm, then dried at 45° C. for 96 hours, and sieved using a mesh having an opening of 75 μm to obtain core-shell type toner base particles in which the core was composed of a crystalline polyester and the shell was composed of an amorphous polyester.

(Preparation of Color Toner Y11/M11/C11/B11)

100 parts of amorphous polyester resin dispersion A3, 20 parts of crystalline polyester resin dispersion B3, 25 parts of wax dispersion W1, 2 parts of masterbatch 1 of the organic-modified layered inorganic compound, 12 parts of masterbatch 1 of the yellow pigment, and 69 parts of ethyl acetate were mixed, followed by mixing for 120 minutes at 6000 rpm using a TK homomixer (manufactured by PRIMIX Corporation) to obtain oil phase Y1 (solid content: 50%).

A container equipped with a stirrer and a thermometer was charged with 160.5 parts of the water phase and then held at 20° C. on a water bath. Next, 5 parts of modified prepolymer 1 were added to 102 parts of oil phase Y1 maintained at 20° C., and oil phase Y1 was charged into the water phase. While maintaining the temperature at 20° C., mixing was performed for 2 minutes at 8000 rpm using a TK homomixer (manufactured by PRIMIX Corporation) to obtain an emulsified slurry. The solvent was removed under a reduced pressure at 40° C. to obtain a slurry having an organic solvent volatile content of 0%.

Next, the resulting slurry was cooled to room temperature, and then vacuum filtration was performed. To the filter cake, 200 parts of ion-exchanged water were added, mixing was performed using Three-one motor (manufactured by Shinto Scientific Co., Ltd.) at 800 rpm for 5 minutes, and after reslurrying, filtering was performed. Furthermore, 10 parts of a 1% by mass aqueous sodium hydroxide solution and 190 parts of ion-exchanged water were added to the filter cake, and reslurrying was performed in the same manner and then filtering was performed. Next, 10 parts of 1% by mass hydrochloric acid and 190 parts of ion-exchanged water were added to the filter cake, and reslurrying was performed in the same manner and then filtering was performed. Furthermore, an operation of adding 300 parts of ion-exchanged water to the filter cake, performing reslurrying, and then performing filtering was repeated twice.

The filter cake was dried without being crushed as it was at 45° C. for 48 hours using a wind-circulation dryer, and then sieved using a mesh having an opening of 75 μm to obtain core-shell type toner base particles in which the core was composed of a crystalline polyester resin and the shell was composed of an amorphous polyester resin.

2-4. Measurement of Physical Properties (Viscosity)

The calculation of log μ(C100) was performed in the same manner except that in the above-described method for measuring the viscosity, data until the elution was completely finished was measured, and the viscosity value when the temperature reached 100° C. was read.

(Average Circularity and Median Diameter)

The average circularities and the median diameters were measured in the same manner as described above.

Table 2 illustrates the resin compositions, production conditions, and physical properties of color toners 1 to 13.

In addition, the white toners and the color toners illustrated in Table 3 were used and the following tests were conducted under the conditions illustrated in Table 3. In each test, the fixing temperature refers to the set temperature of the fixing belt (the temperature of the heater), and the surface temperature of pressure roller 63 facing the fixing belt was set to a temperature that was always lower than that of the fixing belt by 50° C.

Note that, in Test 18, an unmodified product in which the fixing section was a roller fixing apparatus was used.

The recording media used were as follows.

PET film: PET50A (Lintec Corporation, A4 80 g·m$^2$)

PP film: PP top clear BO (Avery Dennison Co., Ltd., rolled paper, 112·m$^2$)

Sheet: npi high-quality paper (Nippon Paper Industries Co., Ltd., rolled paper, 127.9 g·m$^2$)

3-1. Image Surface Roughness

First, the white toner and the color toner were stacked in this order on the recording medium to form a solid chart corresponding to a coverage rate of 20%. The toner adhesion amount was set such that the toner adhesion amount of the white toner was 8 g/m$^2$ and the toner adhesion amount of the color toner was 4 g/m$^2$.

Next, the solid chart had a white and color overlapping setting, and 10000 sheets were outputted at a fixing temperature of 150° C. When rolled paper was used, image output was performed with a length equivalent to 10000 sheets. In a case where roll setting could not be performed in the sheet feed mechanism, the rolled paper was cut into an A4 size, and an image output test of 10000 sheets was performed.

Then, for the images outputted on the 9000-th to 10000-th sheets, the surfaces of the toner images were visually observed with an optical microscope and evaluated according to the following criteria.

TABLE 2

| | Amorphous polyester | | Crystalline polyester | | | | | | |
|---|---|---|---|---|---|---|---|---|---|
| Toner No. | Type | Number of parts | Type | Number of parts | Fabrication method | Drying conditions | D50 (μm) | Average circularity | log μ(C100) |
| Y1M1C1K1 | A1 | 60 | B1 | 40 | Dry type | Hot air treatment at 130° C., 30 minutes | 6.4 | 0.940 | 4.0 |
| Y2M2C2K2 | A1 | 55 | B1 | 45 | Dry type | Hot air treatment at 130° C., 30 minutes | | 0.940 | 3.7 |
| Y3M3C3K3 | A1 | 52 | B1 | 48 | Dry type | Hot air treatment at 130° C., 30 minutes | | 0.940 | 3.5 |
| Y4M4C4K4 | A1 | 70 | B1 | 30 | Dry type | Hot air treatment at 130° C., 30 minutes | | 0.940 | 4.5 |
| Y5M5C5K5 | A1 | 80 | B1 | 20 | Dry type | Hot air treatment at 130° C., 30 minutes | | 0.940 | 4.7 |
| Y6M6C6K6 | A1 | 60 | B1 | 40 | Dry type | Hot air treatment at 130° C., 50 minutes | | 0.940 | 4.0 |
| Y7M7C7K7 | A2 | 55 | B2 | 45 | Dry type | Hot air treatment at 130° C., 30 minutes | | 0.940 | 4.5 |
| Y8M8C8K8 | A1 | 55 | B1 | 45 | Dry type | Wind-circulation dryer at 45° C./60 h drying | | 0.940 | 4.0 |
| Y9M9C9K9 | A3 | 100 | B3 | 20 | Wet type | Wind-circulation dryer at 45° C./72 h drying | | 0.953 | 4.0 |
| Y10M10C10K10 | A1 | 95 | B1 | 5 | Dry type | Hot air treatment at 130° C., 30 minutes | | 0.940 | 4.9 |
| Y11M11C11K11 | A1 | 97 | B1 | 3 | Dry type | Hot air treatment at 130° C., 30 minutes | | 0.940 | 5.0 |
| Y12M12C12K12 | A3 | 100 | B3 | 20 | Wet type | Wind-circulation dryer at 45° C./48 h drying | | 0.970 | 4.0 |
| Y13M13C13K13 | A1 | 60 | B1 | 40 | Dry type | Hot air treatment at 130° C., 30 minutes | | 0.910 | 4.0 |

3. Tests and Evaluation

<Tests 1 to 19>

As the image forming apparatus, a commercially available printer "magicolor (registered trademark) 2300DL" (manufactured by Konica Minolta, Inc.) employing an electrophotographic method, in which the fixing section was modified to a surf fixing section illustrated in FIG. 3, was used.

Good: No problem

Fair: Slight irregularities and scratches could be confirmed

Worse: Irregularities and scratches could be confirmed

Poor: There were obvious streaks 3-2. Belt Breakability

A solid chart corresponding to a coverage rate of 20% was formed in the same manner as in 3-1 above, and 10000 sheets were outputted at a fixing temperature of 150° C. When rolled paper was used, image output was performed with a length equivalent to 10000 sheets. In a case where roll setting could not be performed in the sheet feed mechanism, the rolled paper was cut into an A4 size, and an image output test of 10000 sheets was performed. During the test, in a case where breakage, cracking, folding, or the like occurred in the fixing belt, the test was interrupted, whereas in a case where there was no problem, the output was performed to the end. Next, belt breakability was evaluated according to the following criteria.

Good: Passing of 10000 sheets was completed without breakage

Fair: Some visually observable fine scratches but no breakage when the belt surface was observed Worse: Visually observable fine scratches but no breakage when the belt surface was observed Poor: Belt breakage during evaluation 3-3. Low-Temperature Fixability The white toner and the color toners were stacked in this order on the recording medium to form a solid chart. The toner adhesion amount was set such that the toner adhesion amount of the white toner was 8 g/m$^2$ and the toner adhesion amount of the color toner was 4 g/m$^2$.

Next, a test in which output was performed at a fixing temperature of 175° C. and a fixing speed of 250 mm/sec was repeatedly performed while the fixing temperature was changed so as to decrease in increments of 5° C. until cold offset (an image defect in which the toner image was peeled from the sheet and a portion where the sheet surface was visible was present because melting of the solid image of the toner due to heat applied when passing through the fixing section was insufficient) occurred. The fixing temperature setting value at which no cold offset occurred was recorded, which was used as the lower limit fixing temperature and the low-temperature fixability was evaluated.

Good: Lower limit fixing temperature was 130° C. or lower

Fair: Lower limit fixing temperature was higher than 130° C. and 150° C. or lower Worse: Lower limit fixing temperature was higher than 150° C. and 170° C. or lower Poor: Lower limit fixing temperature was higher than 170° C.

A lower lower limit fixing temperature indicates better low-temperature fixability.

3-4. Image Blister

A solid chart corresponding to a coverage rate of 20% had a white and color overlapping setting on the recording medium, and 30 sheets were outputted at a fixing temperature of 150° C. When rolled paper was used, image output was performed with a length equivalent to 30 sheets. In a case where roll setting could not be performed in the sheet feed mechanism, the rolled paper was cut into an A4 size, and an image output test of 10000 sheets was performed. Then, for all the outputted images, the surfaces of the toner images were visually observed with an optical microscope and evaluated according to the following criteria.

Good: No problem

Fair: Occurrence of blisters at one or more and two or less locations within a predetermined range Worse: No practical problem although blisters occurred at three or more and four or less locations within a predetermined range Poor: Occurrence of blisters at four or more locations within a predetermined range/image output could not be performed, and evaluation was not possible Note that, the image blister refers to a phenomenon in which, when the toner is melted by fixing, the water content in an air layer present in the underlying white toner layer is vaporized and the surface of the toner layer becomes a rough state due to air bubbles.

Table 3 illustrates the evaluation results of Tests 1 to 19.

TABLE 3

| Test No. | Recording medium | White toner | Color toner | Logarithm viscosity difference Δlog\|μ | White viscosity log μ(W110) | Average circolarity *1 | Water content *2 |
|---|---|---|---|---|---|---|---|
| 1 | PET film | S1 | Y1M1C1K1 | 1 | 5 | 0.940 | 0.30% |
| 2 | PET film | S1 | Y2M2C2K2 | 1.3 | 5 | 0.940 | 0.30% |
| 3 | PET film | S1 | Y3M3C3K3 | 1.5 | 5 | 0.940 | 0.30% |
| 4 | PET film | S1 | Y4M4C4K4 | 0.5 | 5 | 0.940 | 0.30% |
| 5 | PET film | S1 | Y5M5C5K5 | 0.3 | 5 | 0.940 | 0.30% |
| 6 | PET film | S2 | Y1M1C1K1 | 1 | 3.9 | 0.940 | 0.30% |
| 7 | PET film | S3 | Y1M1C1K1 | 1 | 5.5 | 0.940 | 0.30% |
| 8 | PET film | S4 | Y6M6C6K6 | 1 | 5 | 0.940 | 0.20% |
| 9 | PET film | S5 | Y7M7C7K7 | 0.5 | 5 | 0.940 | 0.20% |
| 10 | PET film | S6 | Y8M8C8K8 | 1 | 5 | 0.940 | 0.60% |
| 11 | PP film | S1 | Y1M1C1K1 | 1 | 5 | 0.940 | 0.30% |
| 12 | PET film | S7 | Y9M9C9K9 | 1 | 5 | 0.953 | 0.60% |
| 13 | PET film | S8 | V11M11C11K11 | 1 | 6 | 0.940 | 0.30% |
| 14 | PET film | S9 | Y12M12C12K12 | 1 | 5 | 0.970 | 0.80% |
| 15 | Sheet | S1 | Y1M1C1K1 | 1 | 5 | 0.940 | 0.30% |
| 16 | PET film | S10 | Y13M13C13K13 | 1 | 5 | 0.910 | 0.30% |
| 17 | PET film | S1 | Y10M10C10K10 | 0.1 | 5 | 0.940 | 0.30% |
| 18 | PET film | S1 | Y1M1C1K1 | 1 | 5 | 0.940 | 0.30% |
| 19 | PET film | S11 | Y13M13C13K13 | 0.2 | 3 | 0.970 | 0.80% |

TABLE 3-continued

| Test No. | Fixing system | Evaluation: Image surface roughness | Belt breakage | Low-temperature fixing | Image blister | Remark |
|---|---|---|---|---|---|---|
| 1 | Surf fixing | Good | Good | Good | Good | Present invention |
| 2 | Surf fixing | Fair | Good | Good | Fair | Present invention |
| 3 | Surf fixing | Fair | Good | Fair | Worse | Present invention |
| 4 | Surf fixing | Fair | Fair | Fair | Good | Present invention |
| 5 | Surf fixing | Worse | Fair | Fair | Fair | Present invention |
| 6 | Surf fixing | Fair | Fair | Good | Good | Present invention |
| 7 | Surf fixing | Good | Good | Worse | Worse | Present invention |
| 8 | Surf fixing | Good | Good | Fair | Good | Present invention |
| 9 | Surf fixing | Fair | Good | Fair | Good | Present invention |
| 10 | Surf fixing | Worse | Fair | Fair | Fair | Present invention |
| 11 | Surf fixing | Good | Good | Good | Good | Present invention |
| 12 | Surf fixing | Good | Good | Fair | Good | Present invention |
| 13 | Surf fixing | Fair | Fair | Poor | Good | Present invention |
| 14 | Surf fixing | Worse | Worse | Fair | Fair | Present invention |
| 15 | Surf fixing | Poor | Poor | Fair | Poor | Present invention |
| 16 | Surf fixing | Fair | Fair | Worse | Fair | Present invention |
| 17 | Surf fixing | Poor | Poor | Fair | Poor | Comparison |
| 18 | Roller fixing | Worse | Fair | Poor | Fair | Comparison |
| 19 | Surf fixing | Poor | Poor | Worse | Worse | Comparison |

As illustrated in Table 3, it is seen that image surface roughness and belt breakage occurred in Tests 17 and 19 in which logarithmic value difference $\Delta(\log \mu W(110) - \log \mu C(100))$ between the viscosities of the white toner and the color toner was less than 0.3. In addition, it is seen that the low-temperature fixability was low in Test 18 in which roller fixing was employed.

In Tests 1 to 16 in which logarithmic value difference $\Delta$ between the viscosities of the white toner and the color toner was 0.3 or more, on the other hand, it is seen that fixing can be performed at a low temperature by surf fixing, and image surface roughness and belt breakage can also be reduced.

From these results, it is seen that by configuring logarithmic value difference $\Delta$ between the viscosities of the white toner and the color toners to be 0.3 or more and performing fixing by surf fixing, image surface roughness and belt breakage can also be reduced while obtaining the low-temperature fixability.

In particular, it is seen that by configuring logarithmic value difference $\Delta$ to be 0.5 or more, image surface roughness can be further reduced (comparison between Tests 4 and 5).

In addition, it is seen that image blisters can be further suppressed by appropriately decreasing the logarithmic value of the viscosity of the white toner (comparison among Tests 1, 6, and 7).

In addition, it is seen that image surface roughness and belt breakage can be further reduced by further reducing the average circularity (comparison between Tests 1 and 16).

INDUSTRIAL APPLICABILITY

According to the present invention, it is possible to provide an image forming method and an image forming apparatus each capable of forming an image excellent in low-temperature fixability and having little image surface roughness.

Although embodiments of the present invention have been described and illustrated in detail, it is clearly understood that the same is by way of illustration and example only and not limitation, the scope of the present invention should be interpreted by terms of the appended claims.

REFERENCE SIGNS LIST

1 Image forming apparatus
10 Heating belt
30 Image processing section
40 Image forming section
41Y, 41M, 41C, 41K, 41W Image forming unit
42 Intermediate transfer unit
43 Secondary transfer unit
50 Conveyance section

51 Sheet feed section
51*a*, 51*b*, 51*c* Sheet feed tray unit
52 Sheet ejection section
52*a* Sheet ejection roller
53 Conveyance path section
53*a* Registration roller pair
60 Fixing section
61 Fixing belt
62 Heater
63 Pressure roller
70 Image reading section
71 Sheet feeding apparatus
72 Scanner
72*a* CCD sensor
100 Surface treatment apparatus
110 Hopper
120 Mixing chamber
130 Nozzle
140 Dispersion airflow
150 Diffuser
160 Heat treatment chamber
170 Hot air swirl chamber
180 Cold air supply section
190 Discharge section
200 Surface treatment apparatus
210 Heat treatment chamber
220 Introduction tube
222 Protrusion-shaped member
230 Supply tube
240 Powder particle supply port
250 Hot air supply means
260 Hot air introduction section
270 Swiveling member
280 Distribution member
290 Cold air introduction section
411 Exposure apparatus
412 Developing apparatus
413 Electrophotographic photoreceptor
414 Charging apparatus
415 Drum cleaning apparatus
421 Intermediate transfer belt
422 Primary transfer roller
423, 431 Support roller
423A Backup roller
426 Belt cleaning apparatus
426*a* Elastic member
431A Secondary transfer roller
432 Secondary transfer belt
D Document
S Recording medium

What is claimed is:

1. An image forming method, comprising:

forming, on a recording medium, a toner image including a white toner image and a color toner image disposed on the white toner image; and fixing the toner image onto the recording medium, wherein in the fixing, the recording medium is nipped between an annular belt and a facing member, and the toner image is fixed onto the recording medium under heating, the recording medium being a recording medium on which the toner image is formed, the annular belt including an inner periphery that is at least partially supported by a heating member, the facing member facing the heating member via the annular belt, and a white toner forming the white toner image and a color toner forming the color toner image satisfy a relationship of a following expression:

$$0.3 \leq \log \mu(W110) - \log \mu(C100)$$

where log μ(W110) is a logarithmic value of a viscosity of the white toner at 110° C., and log μ(C100) is a logarithmic value of a viscosity of the color toner at 100° C.

2. The image forming method according to claim 1, wherein in the fixing, the toner image is heated at 130° C. or more and 170° C. or less.

3. The image forming method according to claim 1, wherein log μ(W110) is 3.9 or more and 5.5 or less.

4. The image forming method according to claim 1, wherein the white toner and the color toner satisfy a relationship of a following expression:

$$0.5 \leq \log \mu(W110) - \log \mu(C100) \leq 1.5.$$

5. The image forming method according to claim 1, wherein:

the white toner contains a white toner base particle, and the white toner base particle has an average circularity of 0.920 and more and 0.955 or less.

6. The image forming method according to claim 5, wherein:

the color toner contains a color toner base particle, and the color toner base particle has an average circularity of 0.920 and more and 0.955 or less.

7. The image forming method according to claim 1, wherein the white toner and the color toner each have a water content of 0.1% or more and 0.6% or less.

8. An image forming apparatus, comprising a fixer that fixes a toner image onto a recording medium, the toner image including a white toner image and a color toner image disposed on the white toner image, wherein the fixer includes:

an annular belt;

a heating member disposed on a side of an inner peripheral surface of the annular belt; and a facing member disposed on a side of an outer circumferential surface of the annular belt and facing the heating member via the annular belt, the fixer nips the recording medium between the annular belt and the facing member and fixes the toner image onto the recording medium, the recording medium being a recording medium on which the toner image is formed, the annular belt being supported by the heating member, and the white toner and the color toner satisfy a relationship of a following expression:

$$0.3 \leq \log \mu(W110) - \log \mu(C100)$$

where log μ(W110) is a logarithmic value of a viscosity of the white toner at 110° C., and log μ(C100) is a logarithmic value of a viscosity of the color toner at 100° C.

* * * * *